United States Patent
Parameswaran et al.

(10) Patent No.: US 8,910,764 B2
(45) Date of Patent: Dec. 16, 2014

(54) OVERRUNNING CLUTCH WITH INTEGRAL PILOTING USING ASSEMBLED BEARING BLOCKS

(71) Applicants: Rajesh Parameswaran, Xenia, OH (US); Michael Bird, Nineveh, IN (US); Salvator Nigarura, Centerville, OH (US); Michael Scott, Columbus, IN (US)

(72) Inventors: Rajesh Parameswaran, Xenia, OH (US); Michael Bird, Nineveh, IN (US); Salvator Nigarura, Centerville, OH (US); Michael Scott, Columbus, IN (US)

(73) Assignee: PMG Indiana Corp., Columbus, IN (US)

( * ) Notice: Subject to any disclaimer, the term of this patent is extended or adjusted under 35 U.S.C. 154(b) by 0 days.

(21) Appl. No.: 13/679,556

(22) Filed: Nov. 16, 2012

(65) Prior Publication Data

US 2013/0126290 A1    May 23, 2013

Related U.S. Application Data

(60) Provisional application No. 61/561,369, filed on Nov. 18, 2011.

(51) Int. Cl.
*F16D 41/066* (2006.01)
*F16H 41/24* (2006.01)
*F16D 15/00* (2006.01)

(52) U.S. Cl.
CPC .............. *F16D 15/00* (2013.01); *F16D 41/066* (2013.01); *F16D 2041/0665* (2013.01)
USPC ................ 192/45.019; 192/45.02; 192/110 B

(58) Field of Classification Search
CPC .......... F16D 41/066; F16D 2041/0601; F16D 2041/0665; F16H 2041/246
USPC ............. 192/45.004, 45.017, 45.018, 45.019, 192/45.02; 60/345
See application file for complete search history.

(56) References Cited

U.S. PATENT DOCUMENTS

| | | | |
|---|---|---|---|
| 3,087,589 A * | 4/1963 | Gorsky | 192/45.019 |
| 3,732,956 A | 5/1973 | Johnson et al. | |
| 3,902,508 A | 9/1975 | Sliman, Sr. | |
| 3,902,580 A * | 9/1975 | Johnson | 192/45.011 |
| 4,088,211 A | 5/1978 | Doller et al. | |
| 4,187,937 A | 2/1980 | Kitchin | |
| 4,679,676 A | 7/1987 | King et al. | |
| 4,953,353 A * | 9/1990 | Lederman | 60/345 |
| 4,986,402 A | 1/1991 | Neuwirth et al. | |
| 5,056,636 A | 10/1991 | Lederman | |
| 6,955,252 B2 | 10/2005 | Allport | |
| 7,080,721 B2 | 7/2006 | Yamamoto | |
| 2008/0149453 A1 | 6/2008 | Brees | |
| 2011/0253497 A1* | 10/2011 | Tamura | 192/45 |

\* cited by examiner

*Primary Examiner* — Richard M. Lorence
(74) *Attorney, Agent, or Firm* — Neal P Pierotti; Metz Lewis Brodman Must O'Keefe

(57) ABSTRACT

A clutch is provided that includes an inner race and an outer race that moves relative to the inner race. A pedestal is also provided and the position of the pedestal is fixed with respect to at least one of the inner race or the outer race. A bearing block is also included that engages the pedestal. In some versions of the clutch the bearing block may be made out of plastic or bronze.

28 Claims, 18 Drawing Sheets

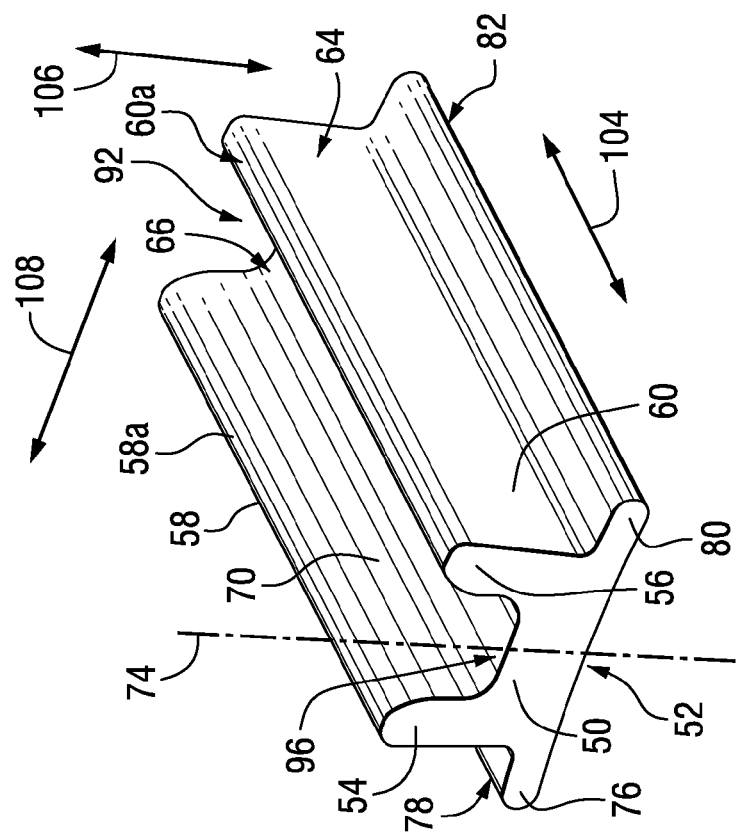
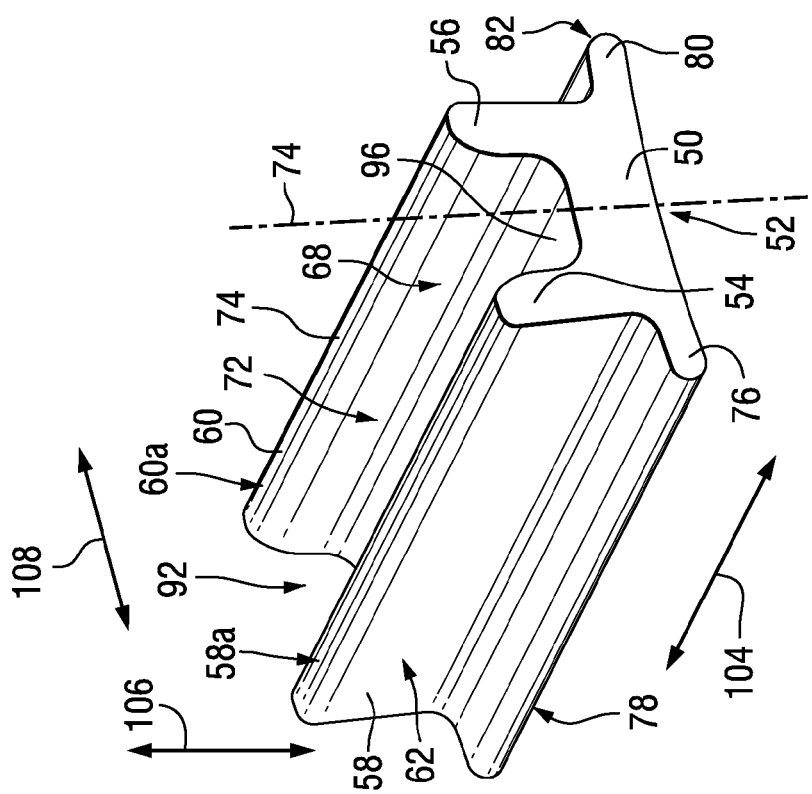

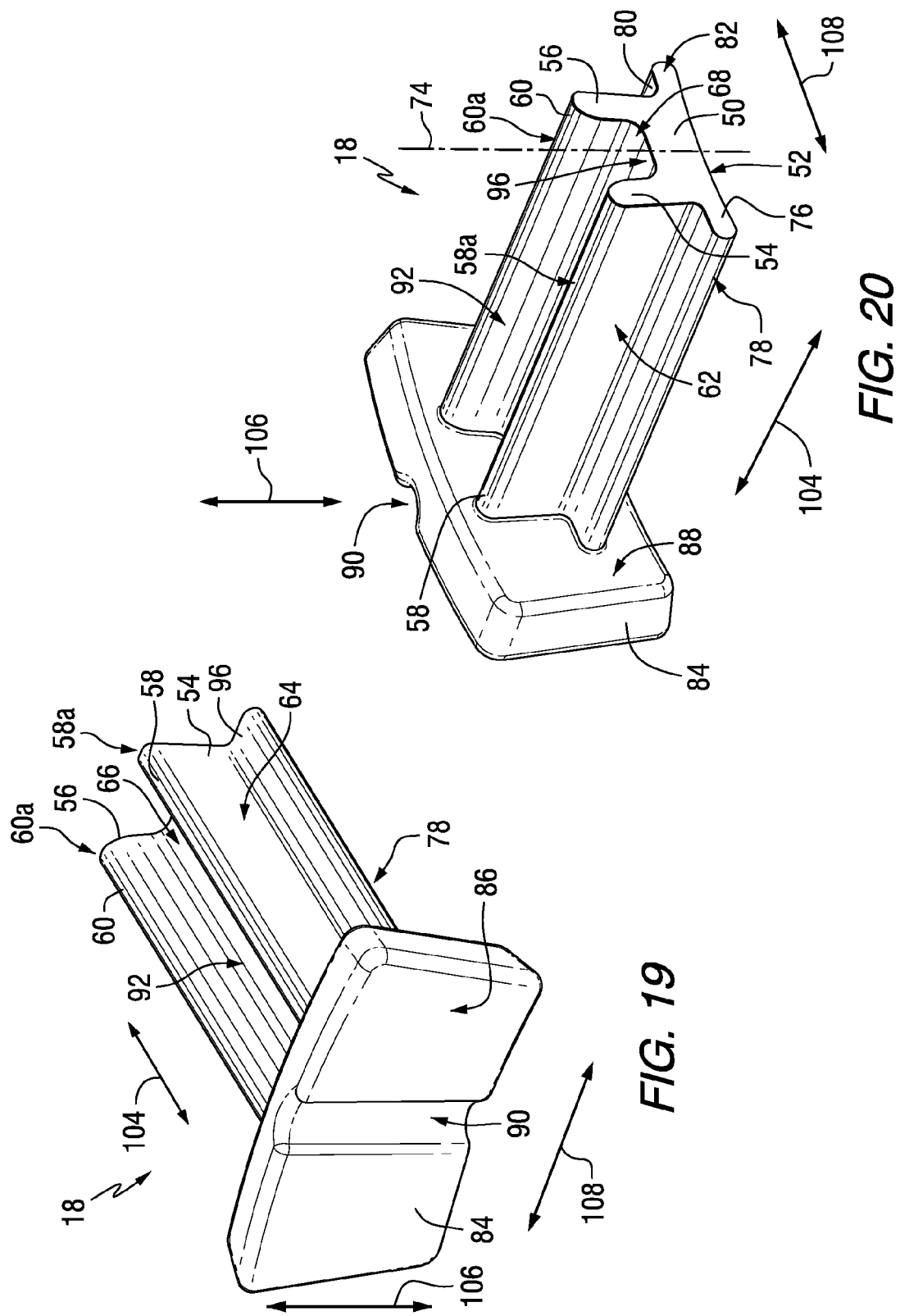

OVERRUNNING CLUTCH WITH INTEGRAL PILOTING USING ASSEMBLED BEARING BLOCKS

CROSS REFERENCE TO RELATED APPLICATION

This application claims the benefit of U.S. Application Ser. No. 61/561,369, filed on Nov. 18, 2011, and entitled, "Overrunning Clutch with Integral Piloting Using Assembled Bearing Blocks for Compact Torque Converter Stators." U.S. patent application Ser. No. 61/561,369 is incorporated by reference herein in its entirety for all purposes.

BACKGROUND OF THE INVENTION

1. Field of the Invention

The present invention relates generally to a one-way clutch that includes a bearing block for supporting at least one rotational member. More particularly, the present application involves an overrunning clutch that includes a bearing block mounted to a pedestal that engages a race of the clutch to achieve integral piloting and reduced wear.

2. Description of the Prior Art

Rotational power transmission devices, such as torque converters and other automotive transmission components, function to impart torque from one shaft to another shaft when desired. These devices use roller one-way clutches (OWC) extensively. As components in transmissions, roller one-way clutches allow for smooth transitions from one torque path to another as the transmission shifts through its operating ranges. Typically, this is achieved by preventing the rotation of an element of a planetary gear set or by allowing for relative rotation between members of the gear set. In torque converters, the OWC locks up the stator during vehicle launch, when there is a high speed differential between the impeller and the turbine, and redirects the fluid flow into the impeller, improving the efficiency of the converter. When the vehicle is coasting and the speed differential between the impeller and turbine is reduced, the OWC allows the stator to free-wheel or overrun. In this condition, torque is no longer transferred across the OWC. One-way clutches used in torque converters operate in a high temperature environment (100°-120° C.) for a significant portion of their operation. Imbalances inherently present in the stator assembly result in radial inertial loads that are active during the overrunning portion of the duty cycle for the clutch. During this stage, the components of the OWC rotate relative to one another; consequently, clutch elements are needed that act as journal surfaces, supporting and centering the rotating components.

Known torque converter (stator) clutches 10 are disclosed with reference to FIGS. 1 and 2. The clutch 10 includes rollers 100 that are urged by energized springs 102 to be in contact with an inner race 12 and an outer race 14 that is installed in a stator 44. The springs 102 are supported by pedestals 16 that extend from the outer race 14. Movement of the components in the axial direction 104 is prevented through the use of features on the stator 44 as well as other components such as retainers 110 and/or circlips in the clutch 10 assembly. Fluid exiting a turbine portion of the converter impinges upon blades of the stator 44 and drives the stator 44 and the outer race 14 installed within to rotate in a counterclockwise direction about an axis of revolution 98 of the clutch 10. In turn, the rollers 100 are rotated into a locking position between the inner race 12 and the outer race 14. The reaction of the stator 44 against the inner race 12 serves to add to the torque delivered to the resulting turbine output shaft. Alternatively, when the relative slip between the turbine and impeller in the torque converter 10 is low or zero, the fluid exiting the turbine vanes or blades strikes the opposite side of the blades of the stator 44 and causes the stator 44 to freewheel.

In a conventional stator clutch the rotation of the inner race relative to the rest of the assembly in the overrun mode, in order to maintain concentricity of the components (piloting), is made possible, in the embodiment shown in FIG. 1, and particularly FIG. 1C, through the use of bearing surfaces 110A, 44A that are machined directly onto the stator 44 on one end and on to the retainer 110 at the opposite end. Pedestals 16 therefore do not come into contact with the surface of inner race 12. The machining of these surfaces with the tight tolerances mandatory for piloting is expensive; additionally, the overall length of the stator assembly has to be increased to accommodate the lengths of these bearing surfaces. In the clutch 10 illustrated in FIG. 2, the internal surface of the pedestals 16 are used in place of the machined stator and retainer surfaces described with respect to FIG. 1, in order to maintain concentricity and also achieve more compact sizes. This allows for a smaller envelope for the clutch 10 assembly without sacrificing stator performance.

In order to minimize frictional losses and wear on the inner race 12 in overrun mode, the pedestals 16 are coated with manganese phosphate. The phosphate coatings are applied following a grinding of the inner surfaces of the pedestals 16 and are applied to the entire internal surface of the outer race 14, including pedestal 16 and working surfaces. Shot blasting is then performed on the working surfaces of the outer race 14 to remove the phosphate coating therefrom. Aside from the time and expense necessary to apply the manganese phosphate coating, this design may be problematic in that it may be difficult to ensure complete removal of the coating from active surfaces of the outer race 14. The coating process may not be easily integrated into a production environment, and may not perform well enough to meet the requirements necessary in applications that require high durability in which high overrun speeds and greater imbalance loads are present on the stator 44 resulting in a breakdown of the phosphate coating over time and a resulting contamination of hydraulic fluid in the torque converter.

One known example of an overrunning clutch is described in Johnson, et al., U.S. Pat. No. 3,732,956, the entire contents of which are incorporated by reference herein in their entirety for all purposes. This design features an overrunning roller clutch that has an inner race and an outer race with a caged roller sub-assembly located radially therebetween. The caged roller sub-assembly cooperates with the inner and outer races to permit them to rotate relative to one another in one direction while locking them together in response to relative rotation in the opposite direction. The springs, rollers, and bearing blocks are retained within the caged sub-assembly. The caged sub-assembly is made of a series of stamped metal segments that are connected to one another in series. Although capable of forming an overrunning roller clutch, the caged sub-assembly and resulting components are complex in nature and include many operating parts.

Yamamoto, et al., U.S. Pat. No. 7,080,721, discloses a clutch mechanism which includes the use of a block bearing extending between the inner and outer races. These block bearings are removable, unitary devices which extend entirely between the races. The block bearings are not functionally associated with the clutch rollers or springs, but serve only a piloting function. No pedestals integrally formed with either race are disclosed which are associated with the piloting function.

Another overrunning clutch assembly is disclosed in King, et al., U.S. Pat. No. 4,679,676, the contents of which are incorporated by reference herein in their entirety for all purposes. This overrunning clutch features a concentric control cage that maintains an inner race and outer race in a co-axial arrangement with one another. The control cage includes a cage body and a pair of metal end rings. For assembly purposes the control cage is a single unitary structure but in operation functions as if the control cage is made of a plurality of separate pieces connected to one another. A plurality of journal blocks are included in the cage body with lower surfaces that engage the inner race during overrun. The cage body and journal blocks are made of a plastic material with desirable frictional characteristics. Double side rails are present in order to circumferentially interconnect the journal blocks and extend around the entire circumference of the cage body. The disclosed arrangement accounts for thermal expansion within the clutch assembly between the different components made of different materials and geometries during operation of the overrunning clutch. Although capable of working for its intended purpose, the above disclosed designs include a high number of complex molded parts. The use of the cage body in a one way clutch assembly requires the sacrificing of the axial length of the rollers thus resulting in an overall lower torque carrying capacity. This sacrifice may be problematic in the context of a compact torque converter one way clutch design. The use of a caged spring and roller system introduces additional complexity with regards to assembly automation. As such, there remains room for variation and improvement in the art. The invention described here seeks to address these shortcomings described. The strength of the current invention lies in its simplicity, ease of assembly and facility for use in compact environments.

SUMMARY OF THE INVENTION

In accordance with one aspect of the design, a clutch is provided that includes an inner race and an outer race that moves relative to the inner race. A pedestal is included and the position of the pedestal is fixed with respect to either one of the inner race or the outer race. A bearing block is present and engages the pedestal.

Another aspect of the present design resides in a clutch that includes an inner race and an outer race that moves relative to the inner race. A bearing block is present that engages the inner race. The bearing block includes a base and a body that extends from a bottom surface of the base in an axial direction. The bottom surface of the base engages at least one of the inner race and the outer race.

In accordance with a yet additional aspect of the design, a clutch is provided that includes an inner race and an outer race that moves relative to the inner race. A bearing block is present and is located between the inner race and the outer race in a radial direction. The bearing block defines a channel that extends in an axial direction, and the bearing block defines a second channel that likewise extends in the axial direction.

Additional exemplary embodiments exist in which the bearing block, if present, is made of bronze, babbitt or polymeric material, including, without limitation, liquid crystal polymers.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figures in which:

FIG. 13 is a left isometric view of a bearing block in accordance with another exemplary embodiment.

FIG. 14 is a right isometric view of a bearing block of FIG. 13.

FIG. 19 is a front isometric view of a bearing block in accordance with another exemplary embodiment.

FIG. 20 is a back isometric view of the bearing block of FIG. 19.

Figure 1A:
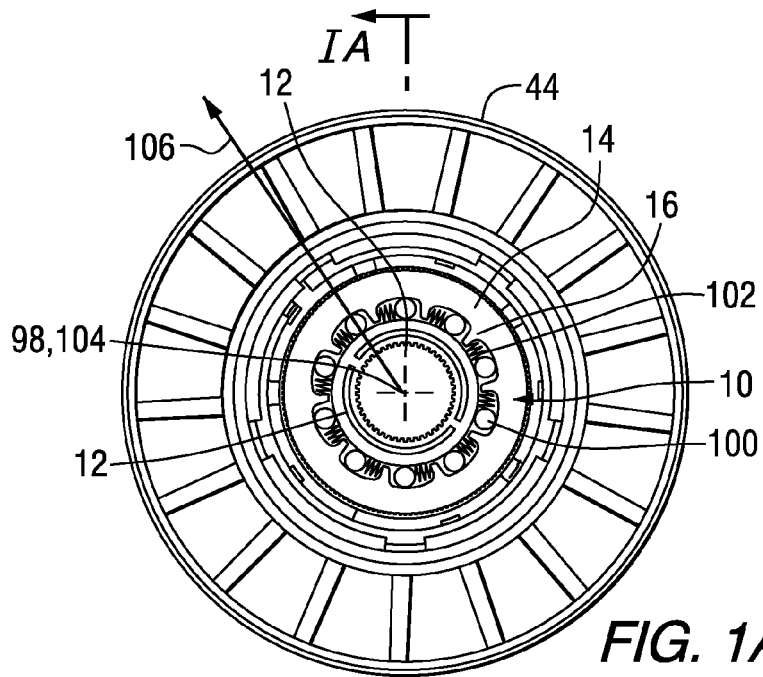
FIG. 1A is a front elevational view of a clutch of known design.

Repeat use of reference characters in the present specification and drawings is intended to represent the same or analogous features or elements of the invention.

DETAILED DESCRIPTION OF THE PREFERRED EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 3:
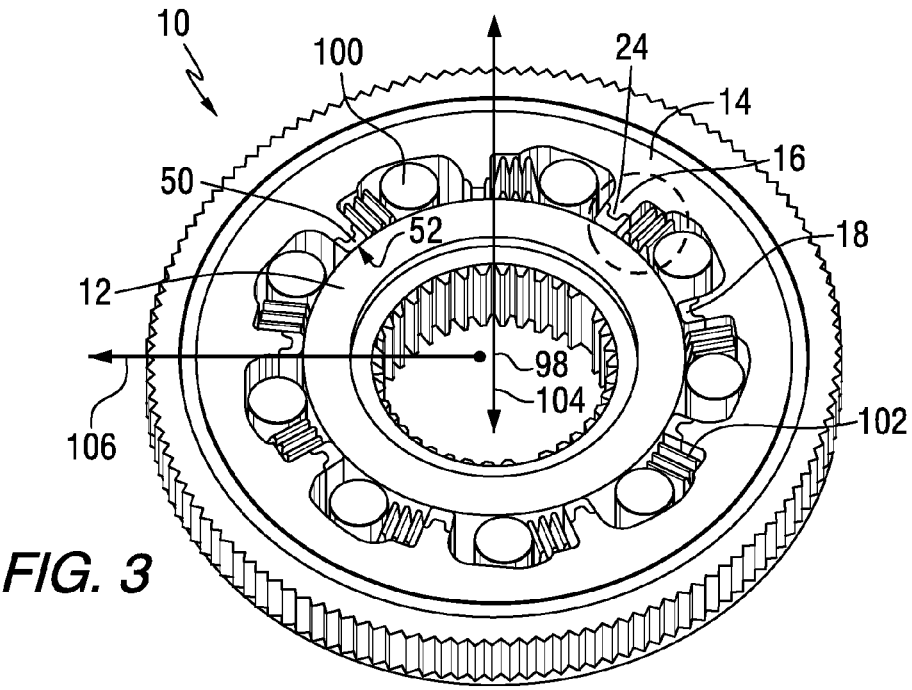
FIG. 3 is a front isometric view of a clutch in accordance with one exemplary embodiment.

As generally illustrated in FIG. 3, the present invention provides for a clutch 10, such as a roller one-way clutch, for torque converters or transmission clutches, that includes an inner race 12 piloted by several molded bearing blocks 18 that are mounted on pedestals 16 of an outer race 14. The clutch 10 may be an overrunning stator clutch that is readily assembled via automation processes, and the bearing blocks 18 can be readily manufactured through the use of bronze, babbitt or a polymeric based low friction material that provides superior performance at high overrun speeds and bearing loads. It is to be specifically noted that the material selected for the bearing block will be highly dependent upon the application. While bronze, babbitt and polymeric materials are specifically contemplated herein, any low friction material may be selected which will permit the non-destructive relative movement of the bearing block and the adjacent race surface. In some embodiments, expensive machining of internal surfaces of the stator 44 and retainer 110 can be eliminated through the use of the bearing blocks 18. The use of the bearing blocks 18 maintains the same torque capacity of stators that are machined since the active torque bearing areas of the clutch 10 remain unchanged. The bearing blocks 18 may be included in some embodiments to support accordion springs 102 that engage rollers 100 in the clutch 10.

Figure 1B:
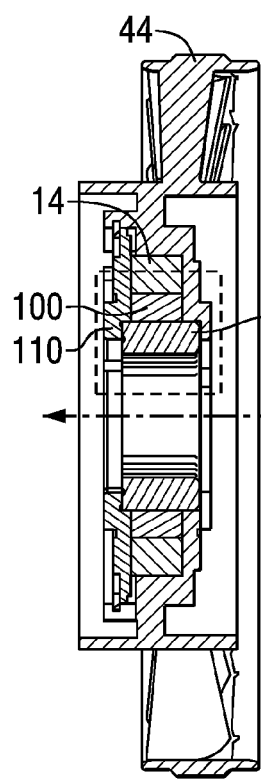
FIG. 1B is a sectional view of the clutch of FIG. 1A taken along line IA-IA.
Figure 1C:
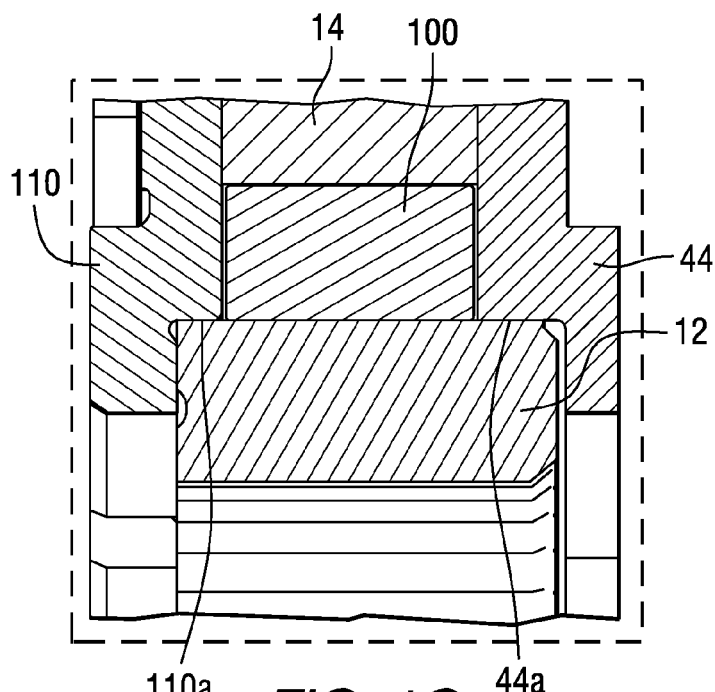
FIG. 1C is a detail view of the section of FIG. 1B shown in chain line.
Figure 2A:
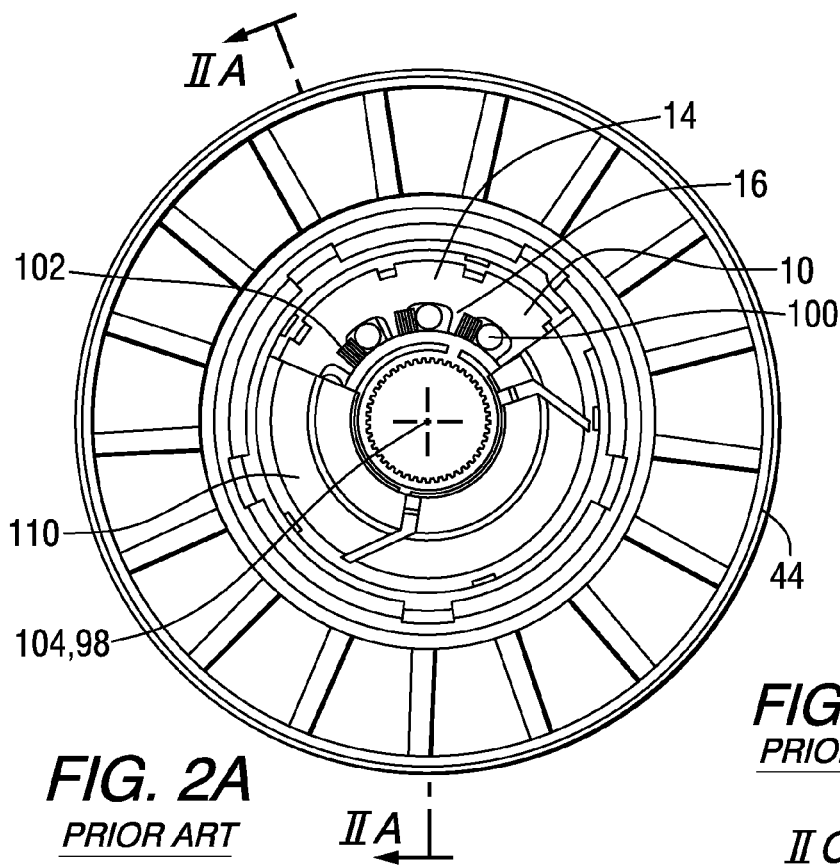
FIG. 2A is a front elevational view of a second embodiment of a clutch of known design.
Figure 2B:
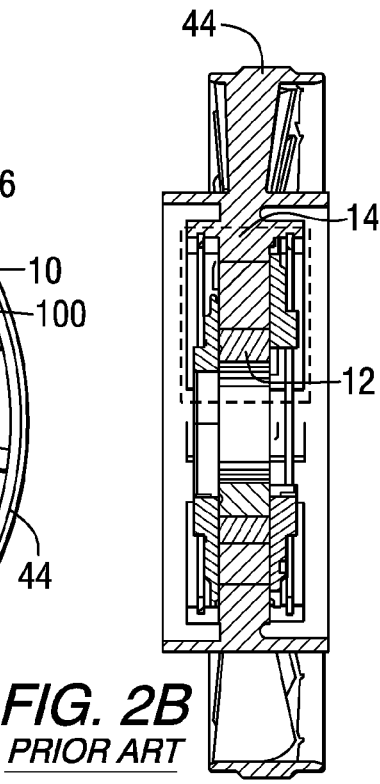
FIG. 2B is a sectional view of the clutch of FIG. 2A taken along line IIA-IIA.
Figure 2D:
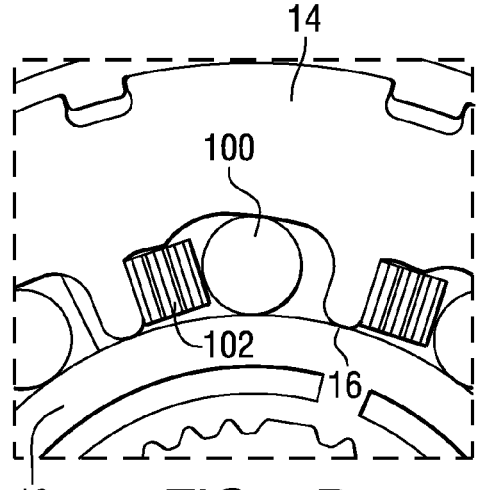
FIG. 2D is a sectional view of the clutch section shown in FIG. 2C taken along line IIC-IIC.
Figure 2C:
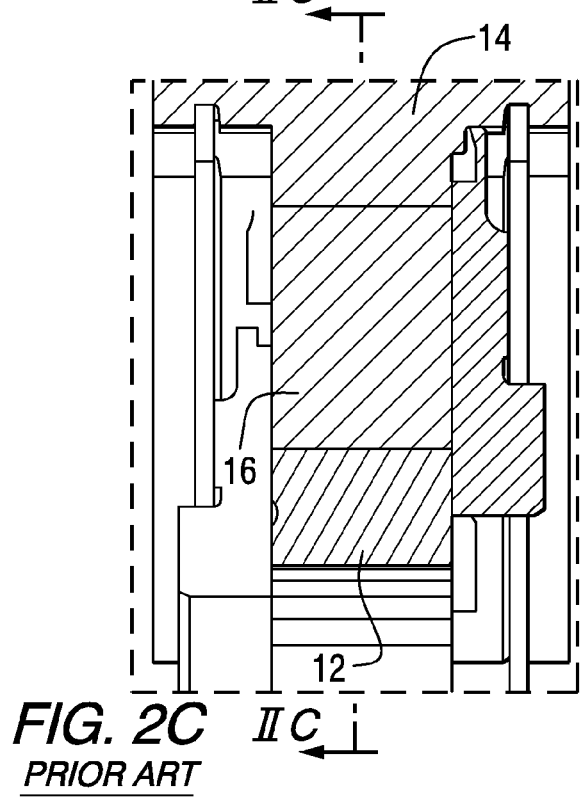
FIG. 2C is a detail view of the section of FIG. 2B shown in chain line.

Clutch 10 includes an outer race 14 which surrounds an inner race 12 in a radial direction 106. This assembly includes a plurality of bearing blocks 18 mounted onto terminal ends 20 of a plurality of pedestals 16 that are integrally formed with the outer race 14. The bearing blocks 18 include piloting surfaces 52 on their terminal ends that engage the inner race 12. For assembly purposes, the outer race 14 may first be inserted or pressed into the stator and movement of the outer race 14 in an axial direction 104 is restricted by features of the stator and a retainer 110 held in place by a staking feature on the stator or a circlip similar to that shown in the prior art of FIGS. 1 and 2. The assembly may lay prone while the bearing blocks 18 are inserted. In this regard, channels 92 of the bearing blocks 18 are slid over terminal ends 20 of the pedestals 16. The shape of the bearing block 18 is complementary to the pedestal 16 to facilitate assembly and ensure retention of the bearing block 18 to the pedestal 16. The inner race 12, springs 102 and rollers 100 may then be inserted and constrained in the axial direction 104 with the retainer 110 that can be affixed to the stator or held in place by a circlip.

The spring 102 engages both the bearing block 18 and the pedestal 16 and may function to act against the roller 100. Any number of bearing blocks 18 can be employed in the clutch 10, and the number of bearing blocks 18 may be the same as the number of pedestals 16 that are present. The engagement between the bearing blocks 18 and the pedestals 16 causes the bearing blocks 18 to remain stationary with respect to the outer race 14 at all times during operation of the clutch 10. The bearing blocks 18 may be stationary with respect to the inner race 12 when the inner race and outer race 12 and 14 are not moving relative to one another when the clutch 10 is engaged. The bearing blocks 18 can be made of bronze, babbitt or polymeric based material to minimize friction with the inner race 12 during times, for instance, when the stator is in overrun mode. The piloting surface 52 may be made of the bronze, babbitt or polymeric material, or the entire bearing block 18 can be made of bronze, babbitt or polymeric material in accordance with various exemplary embodiments. The breakaway and drag torque may be lowered in view of the fact that piloting may not be conducted in arrangements in which steel surfaces of the inner race 12 engage aluminum gliding surfaces of the stator and aluminum or steel guiding surfaces of the retainer 110.

FIGS. 5-8 illustrate the bearing block 18 in accordance with one exemplary embodiment. It is to be specifically noted that no particular arrangement of planar and/or curvilinear surfaces used to define the geometry of the bearing block and pedestal constitutes a single preferred embodiment. Each application may experience different stresses and loads which dictate a particular arrangement or shape. For this reason, each shape is interchangeable with other shapes, so long as a conformal fit exists between bearing block 18 and the associated pedestal 16. Moreover, the precise shape and extent of the interface between bearing block 18 and inner race 12 is also the subject of particular design choices and engineering requirements. No particular preferred embodiment is therefore presented which is determined to be universally applicable.

The outer surfaces of the bearing block 18 are made of a collection of both planar and curvilinear surfaces. The piloting surface 52 is located at the bottom end of the bearing block 18 in the radial direction 106 and is thus located closest to the axis of rotation 98 of the clutch 10. The piloting surface 52 is concave in shape upon extension in a width direction 108 and the concave shape of the piloting surface 52 may be complementary to the corresponding engaging convex surface of the inner race 12. The bearing block 18 includes a body 50 from which a first ear 54 and a second ear 56 extend in the radial direction 106. A terminal end surface 58 that is generally convex in shape is located at the end of the first ear 54 in the radial direction 106. Terminal end surface 60 that is generally convex in shape is located at the end of the second ear 56 in the radial direction 106. Each terminal end surface 58, 60 includes a generally planar central section 58A, 60A, respectively. The body 50, first ear 54 and second ear 56 extend in the axial direction 104 and a first side surface 62 and a second side surface 64 are located on opposite ends of the body 50 in the width direction 108. The first and second side surfaces 62 and 64 are planar in shape although convex edges are present between the surfaces 62 and 64 and the piloting surface 52.

The first ear 54 is shaped so that the convex shape of the terminal end surface 58 ends at a planar surface 70 of the first ear 54. A first concave surface 66 of the bearing block 18 extends from the planar surface 70 to a curvilinear surface 96 of the body 50. The convex terminal end surface 60 of the second ear 56 ends at a planar surface 72 of the second ear 56. A second concave surface 68 of the bearing block 18 extends from the planar surface 72 to the planar surface 96.

The body 50, first ear 54, and second ear 56 define the channel 92. In particular, surfaces 58, 70, 66, 96, 68, 72 and 60 may define the channel 92. The channel 92 is open on its upper end that is the outward most point in the radial direction 106. The first and second ears 54 and 56 may extend from the body 50 so that they are parallel to one another. In other arrangements, the first and second ears 54 and 56 can extend from the body 50 in the radial direction 106 so that they diverge from one another. In this regard, the channel 92 may be greater in the width direction 108 the further the channel 92 is located radially from the axis of rotation 98 of the clutch 10 in the radial direction 106. All of the features of the bearing block 18 may be shaped and sized the same from a terminal end of the bearing block 18 to an opposite terminal end of the bearing block 18 in the axial direction 104 suggesting an inherent mid plane symmetry for the same. An axis of symmetry 74 extends through the bearing block 18 in the radial direction 106. All of the features on one side of the axis of symmetry 74 may be symmetrical to all of the features on the other side of the axis of symmetry 74. In this regard, the features of the first ear 54 are identical to the features of the second ear 56, and the features of the body 50 on one side of the axis of symmetry 74 are identical to the features of the body 50 on the other side of the axis of symmetry 74. It is to be understood, however, that the bearing block 18 may not be symmetrical in this regard in accordance with other exemplary embodiments. The symmetry of the bearing block 18 about the axis of symmetry 74 in addition to its mid plane symmetry allows for the assembly procedure of the bearing block 18 into the clutch 10 to be insensitive to axial orientation of the bearing block 18.

FIGS. 9-12 illustrate portions of an outer race 14 in accordance with one exemplary embodiment. The outer race 14 of the clutch 10 includes a pedestal 16 that extends from a body of the outer race 14 in the radial direction 106 towards the axis of rotation 98 of the clutch 10. The pedestal 16 can be integrally formed with the remaining portions of the outer race 14 and may be made of the same material as the other portions of the outer race 14. The pedestal 16 terminates in the radial direction 106 at a terminal end 20. The terminal end 20 is spaced some distance from the inner race 12 in the radial direction 106. The pedestal 16 has a body 22 and a projection 24 that extends from the body 22 in the radial direction 106. The projection 24 may have a length in the axial direction 104 that is the same as the body 22. The width of the projection 24 in the width direction 108 may be less than the width of the body 22 of the pedestal 16 from which it extends.

The projection 24 includes a first convex surface 26 and a second convex surface 28 that extend from a curvilinear surface 30 that is located at the terminal end 20 of the pedestal 16. The projection 24 has a surface that extends from the first convex surface 26 in the radial direction 106 terminating at a first receiving surface 32. The first receiving surface 32 of the body 22 includes a planar surface 34 that has a surface normal that extends in the radial direction 106. The planar surface 34 forms an end of the first receiving surface 32. A surface of the projection 24 extends from the second convex surface 28 in the radial direction 106 to a second receiving surface 36. The second receiving surface 36 includes a planar surface 38 that has a surface normal that extends in the radial direction 106 and that forms a terminal end of the second receiving surface 36. It is conceivable that surfaces 34 and 38 may be curvilinear in a different realization of the pedestal 16—in that instance the complementary surfaces on the terminal ends of the bearing block shall be curvilinear as well.

Figure 4:
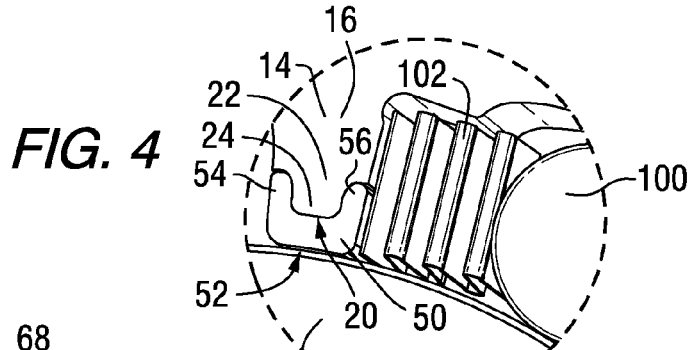
FIG. 4 is a detail view of a portion of the clutch of FIG. 3 shown in a circle.
Figure 5:
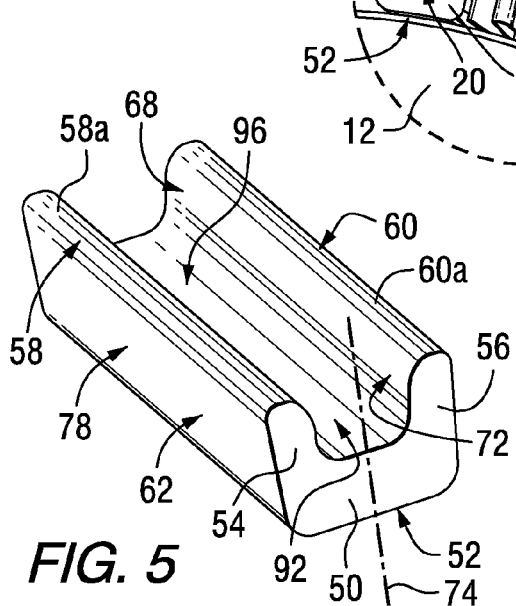
FIG. 5 is a left isometric view of a bearing block.
Figure 6:
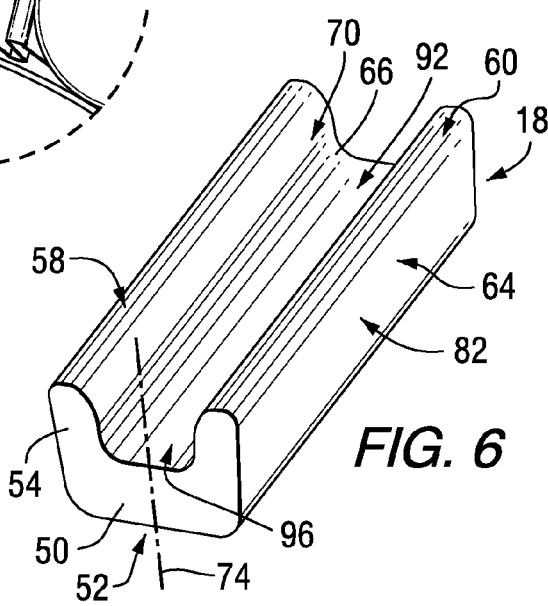
FIG. 6 is a right isometric view of the bearing block of FIG. 5.
Figure 7:
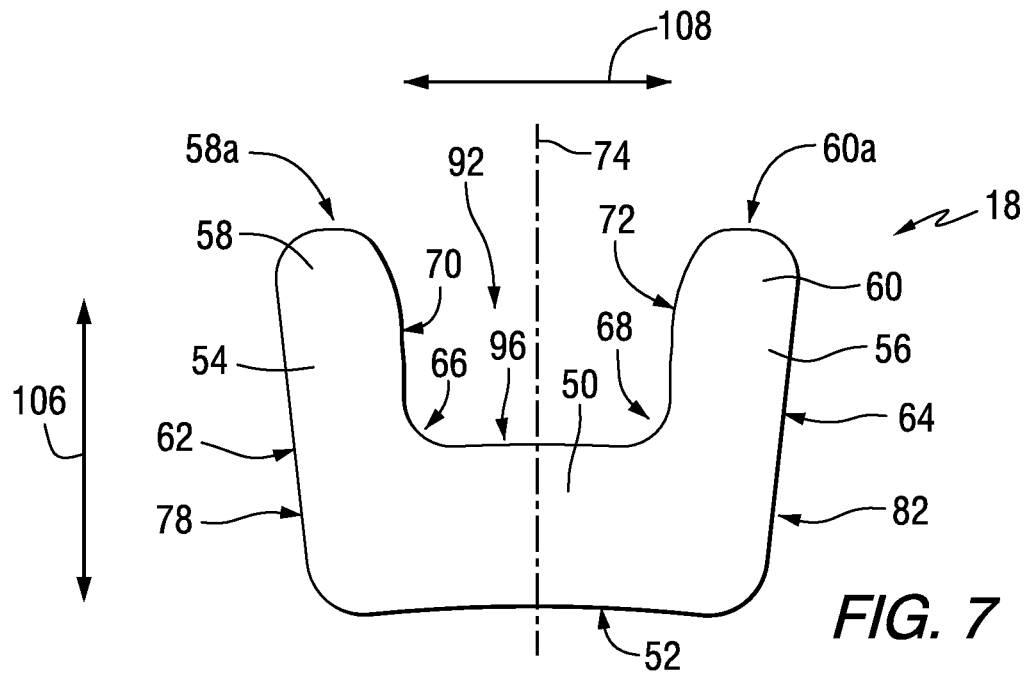
FIG. 7 is a front view of the bearing block of FIG. 5.
Figure 8:
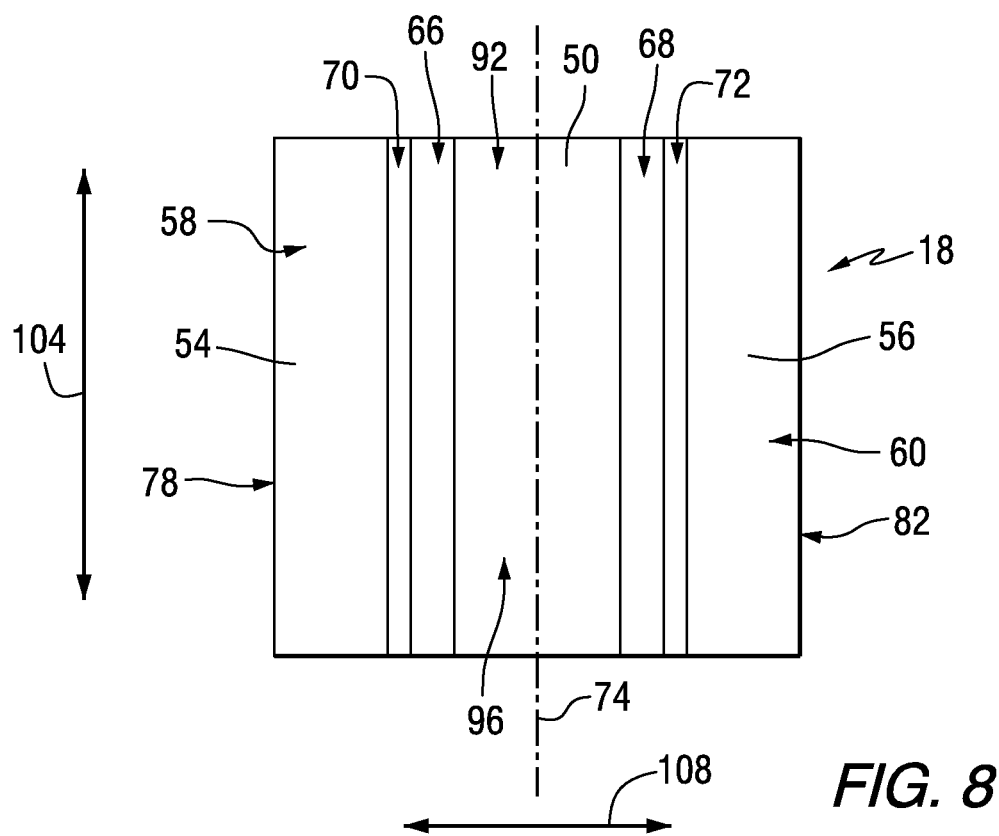
FIG. 8 is a top view of the bearing block of FIG. 5.
Figure 9:
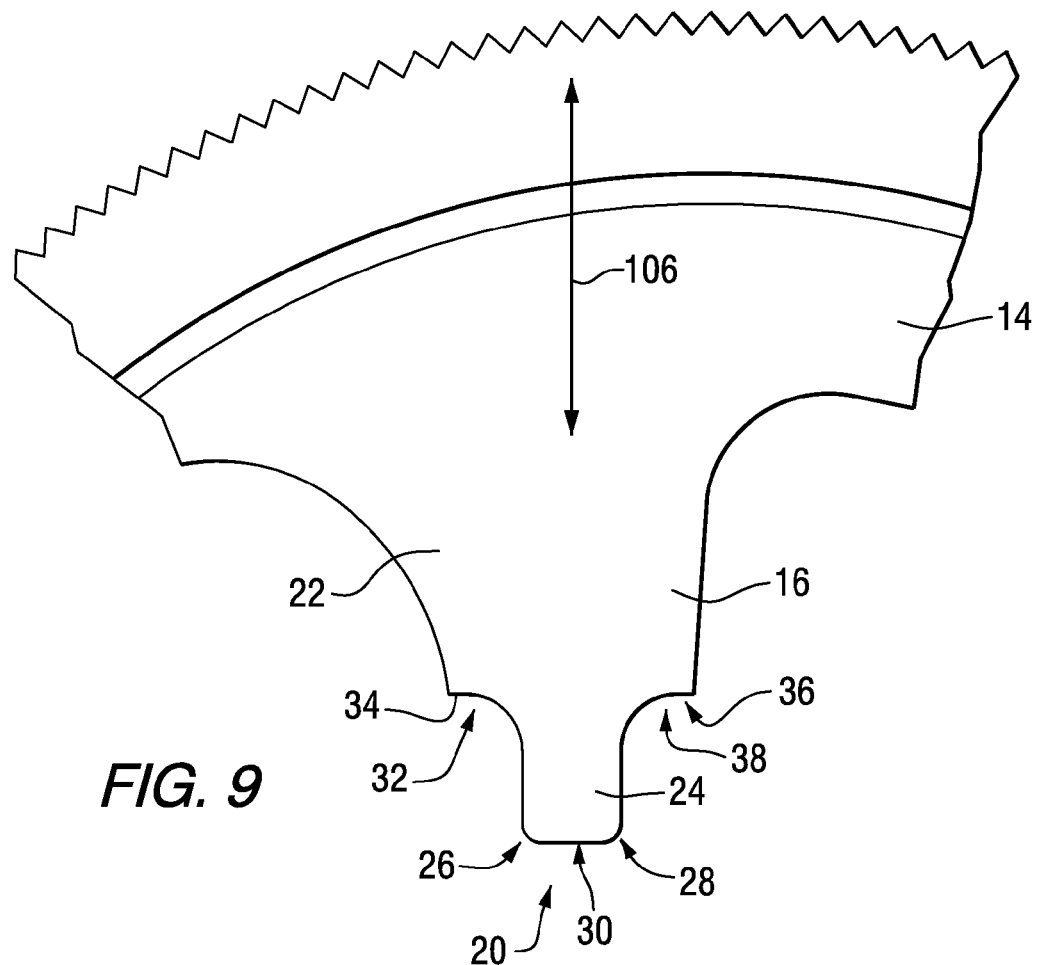
FIG. 9 is a front view of a portion of an outer race in accordance with one exemplary embodiment.
Figure 10:
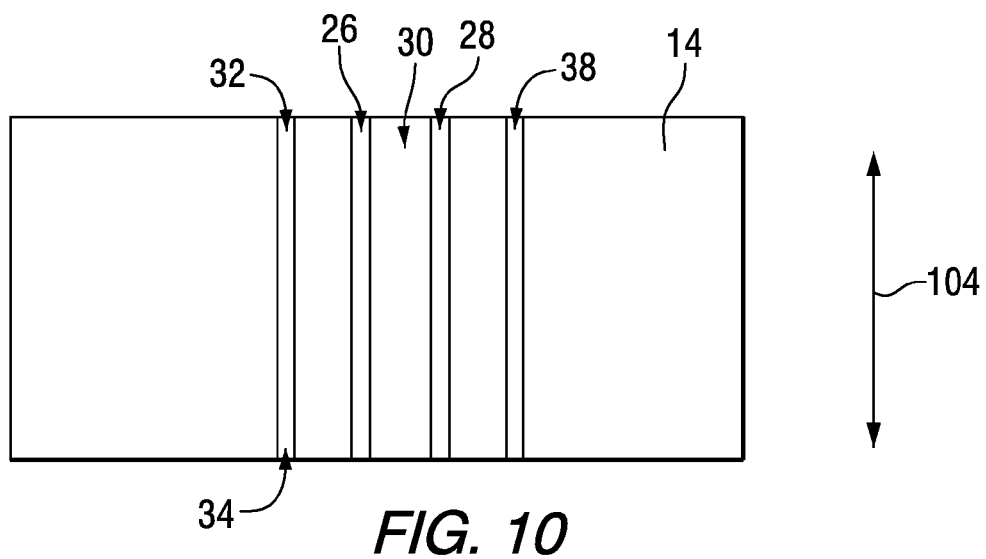
FIG. 10 is a bottom view of the portion of the outer race of FIG. 9.
Figure 11:
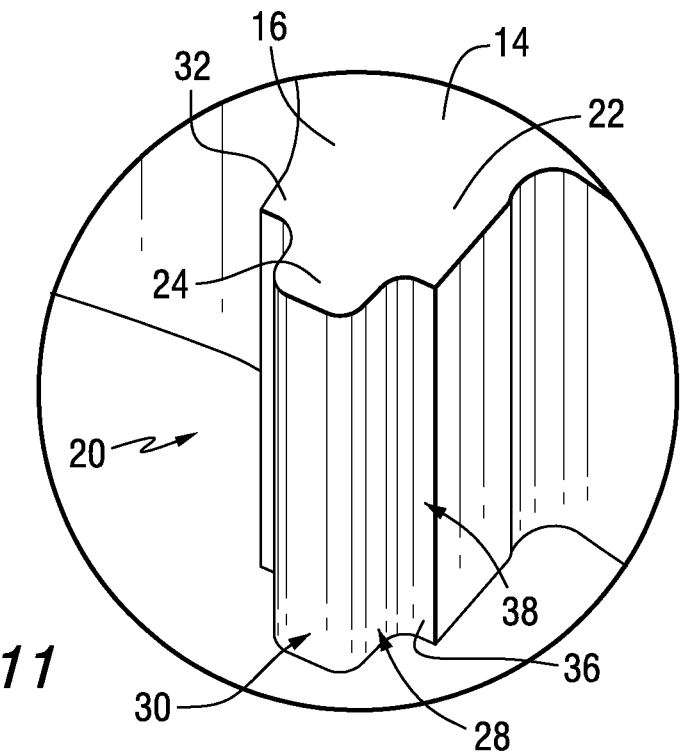
FIG. 11 is a right isometric view of a portion of the outer race of FIG. 9.
Figure 12:
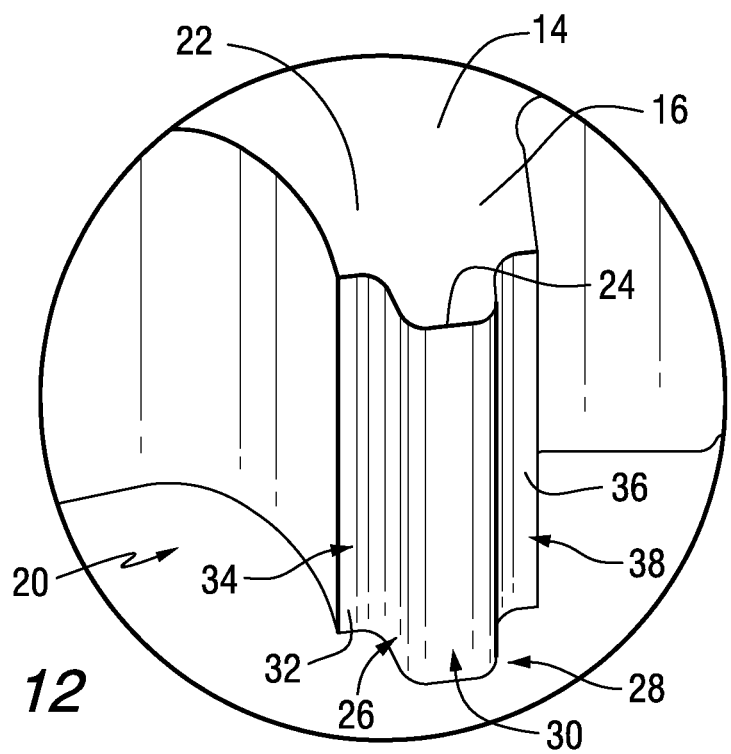
FIG. 12 is a left isometric view of a portion of the outer race of FIG. 9.
Figure 15:
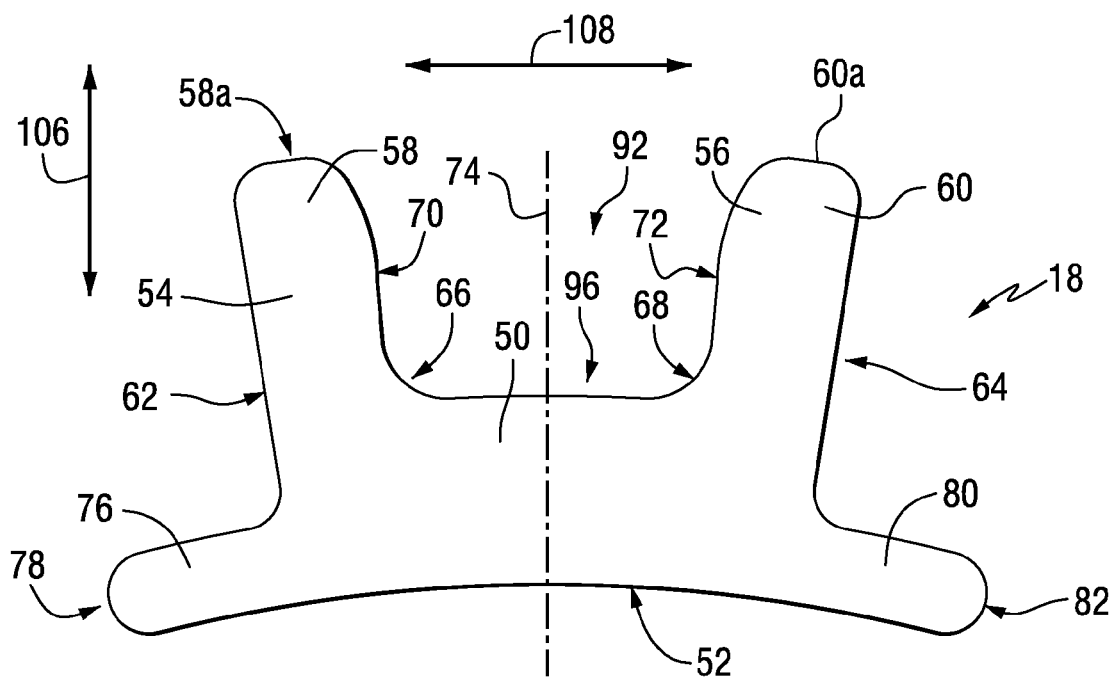
FIG. 15 is a front view of the bearing block of FIG. 13.
Figure 16:
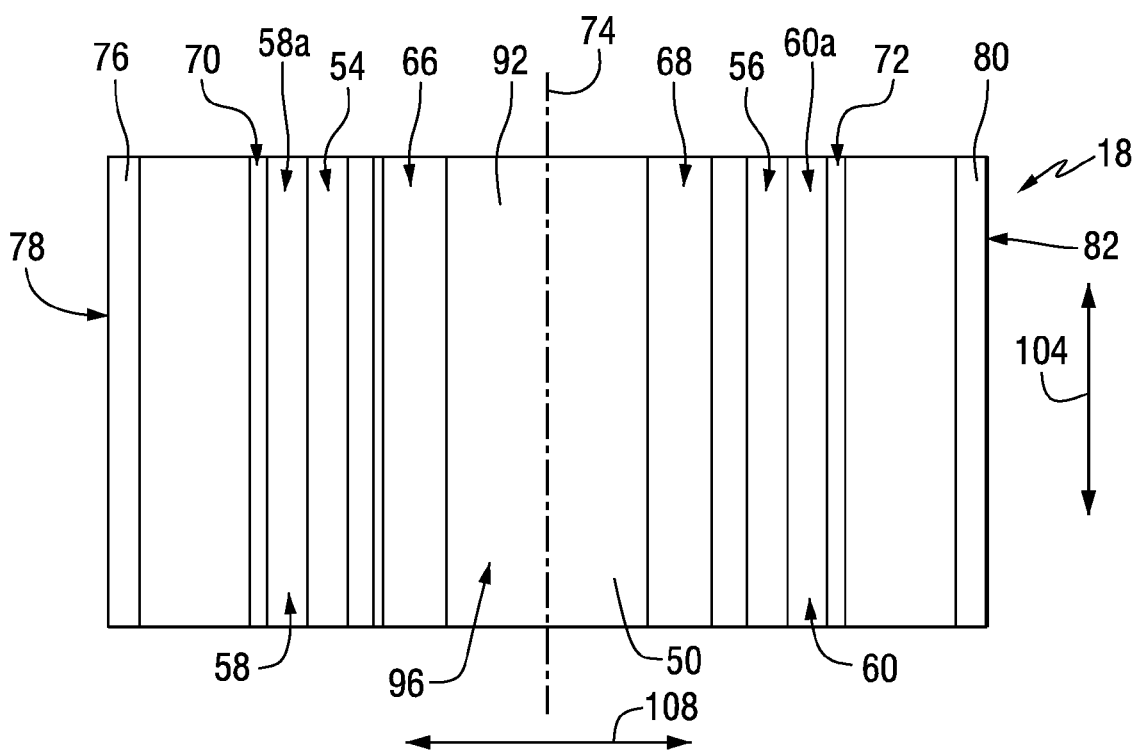
FIG. 16 is a top view of the bearing block of FIG. 13.
Figure 17:
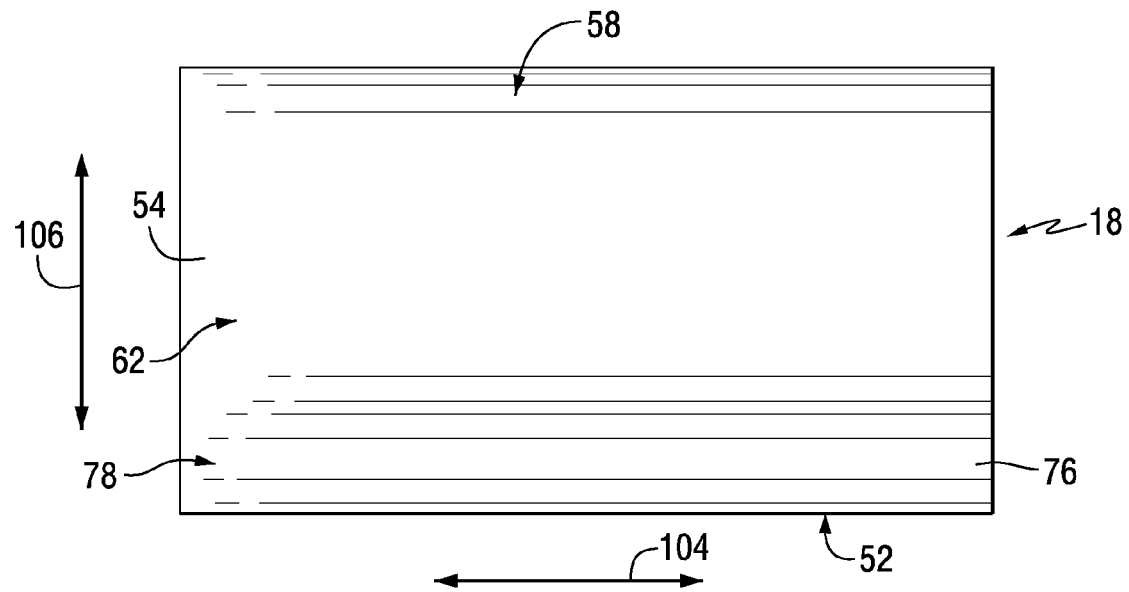
FIG. 17 is a side view of the bearing block of FIG. 13.
Figure 18:
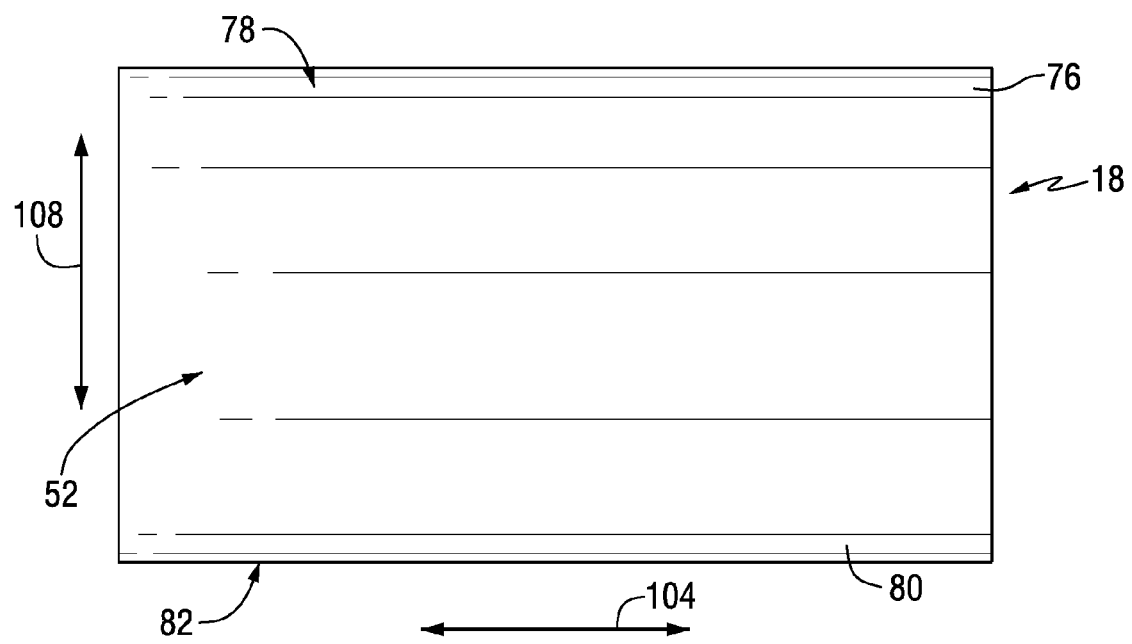
FIG. 18 is a bottom view of the bearing block of FIG. 13.
Figure 21:
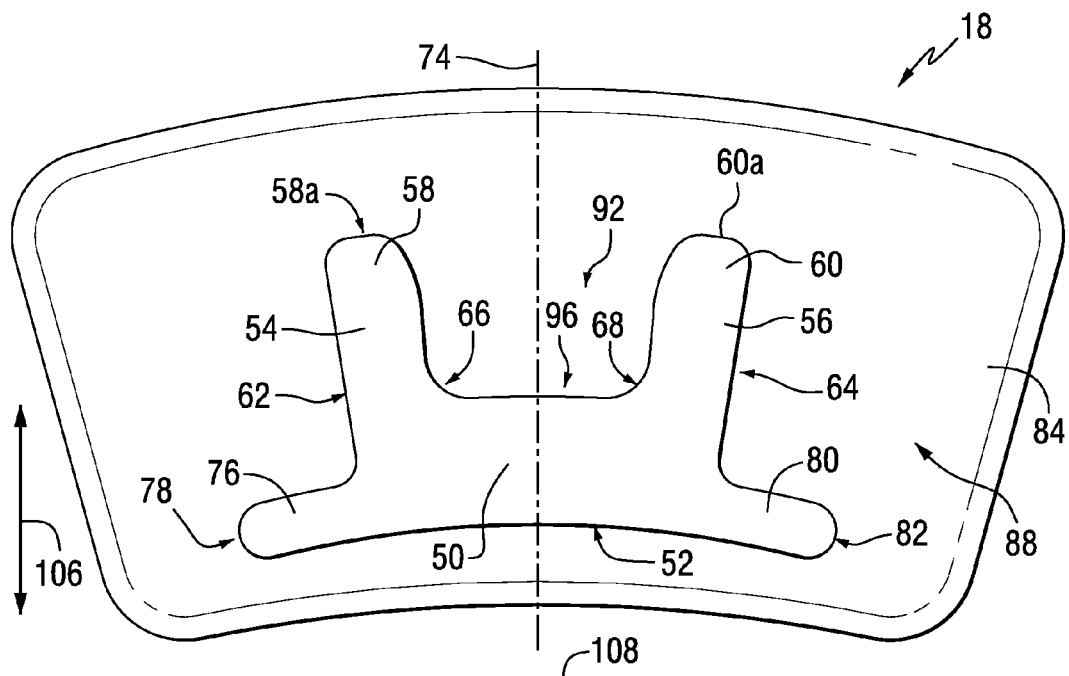
FIG. 21 is a back view of the bearing block of FIG. 19.
Figure 22:
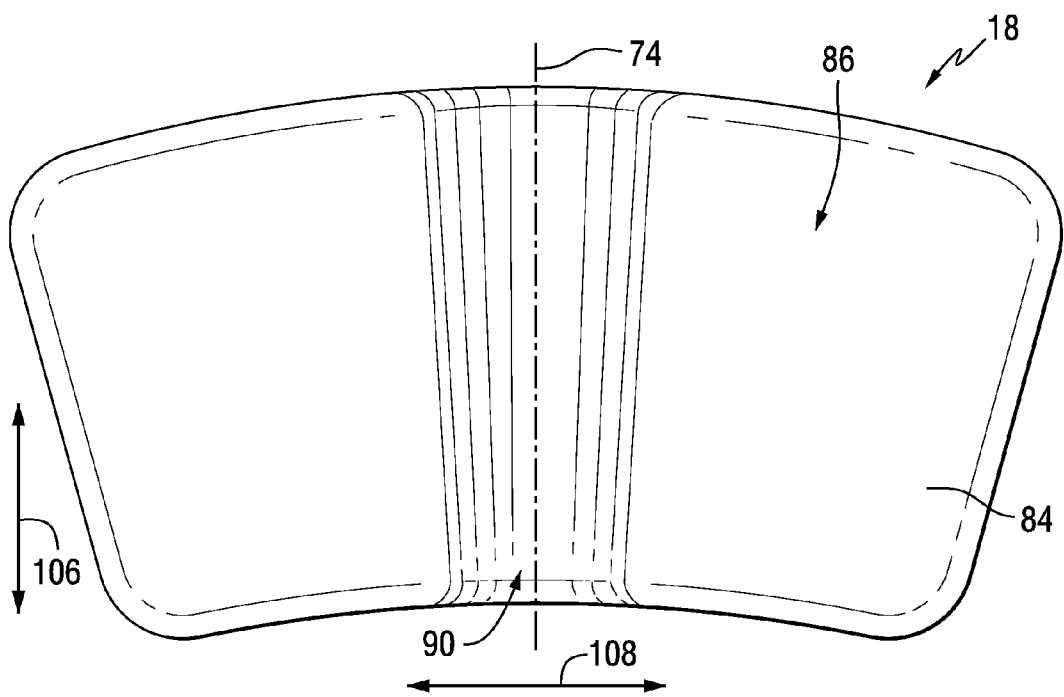
FIG. 22 is a front view of the bearing block of FIG. 19.
Figure 23:
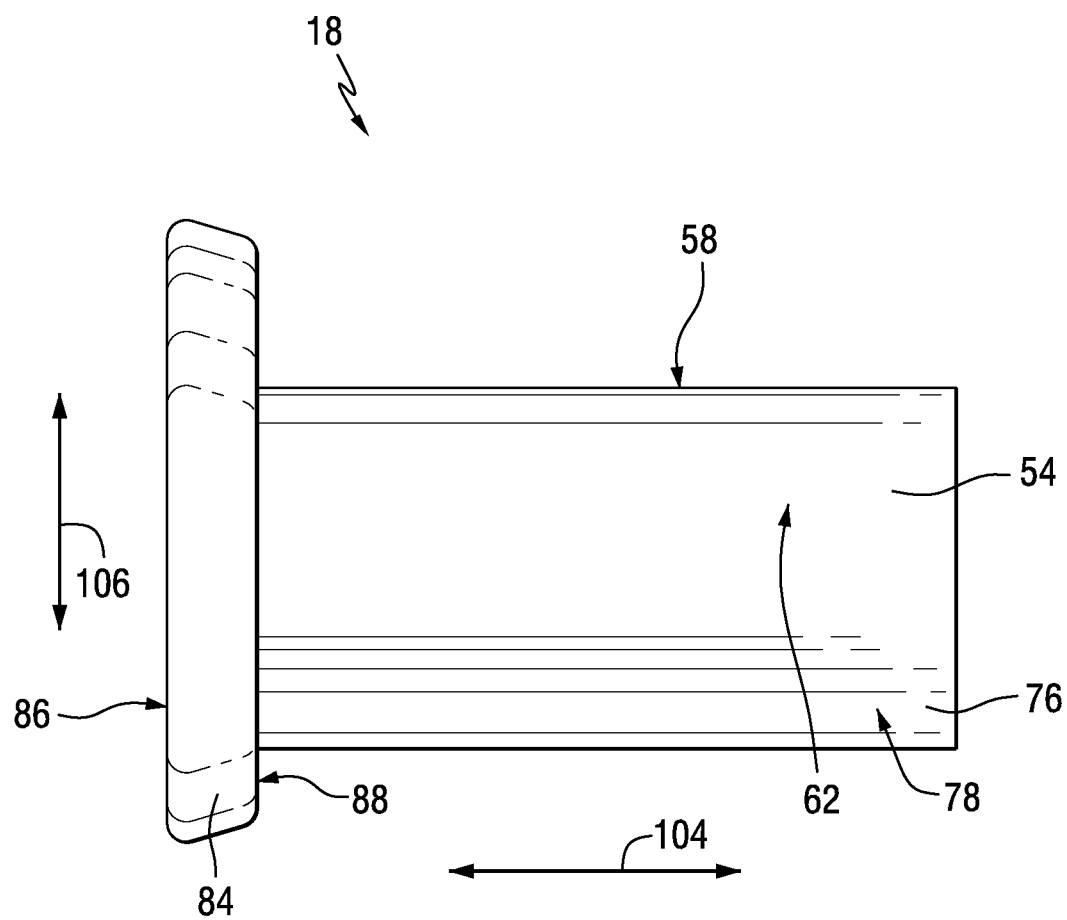
FIG. 23 is a side view of the bearing block of FIG. 19.

The various features of the projection 24 and body 22 of the pedestal 16 can be the same in size and shape upon extension in the axial direction 104 from a terminal end of the pedestal 16 to the opposite terminal end of the pedestal 16 in the axial direction 104. With reference back to FIGS. 3 and 4, the bearing block 18 is shown engaged onto the pedestal 16. This engagement may be an interference fit or may simply be a tight fitting engagement in accordance with various exemplary embodiments. The terminal end surface 58 engages the first receiving surface 32 and central section 58A may engage the planar surface 34. The first concave surface 66 may engage the first convex surface 26, and the planar surface 70 may engage the surface of the projection 24. The curvilinear surface 96 engages the curvilinear surface 30, and the second concave surface 68 engages the second convex surface 28. The planar surface 72 engages the surface of the projection 24, and the terminal end surface 60 engages the second receiving surface 36 and central section 60A may also contact the planar surface 38. The projection 24 is thus located within the channel 92 of the bearing block 18. Movement of the bearing block 18 with respect to the pedestal 16 is constrained in the radial direction 106 by the presence of the inner race 12, in the width direction 108 due to the configuration of the projection 24 and the channel 92, and in the axial direction 104 by the retainer 110 and circlips, or other feature that affects axial retention between these two components. The spring 102 engages both the body 22 of the pedestal 16 and the terminal right side end 82 of the bearing block 18. The spring 102 may in some instances also engage the terminal end surface 60 in some arrangements.

An alternative exemplary embodiment of the bearing block 18 is disclosed with reference to FIGS. 13-18, with like corresponding parts numbered accordingly. The bearing block 18 includes a body 50, first ear 54, and second ear 56 that can be arranged in manners previously discussed and a repeat of this information is not necessary. The first side surface 62 and the second side surface 64 may be parallel to one another in the radial direction 106 or can be divergent from one another in the radial direction 106 upon extension outward from the axis of revolution 98 of the clutch 10. The ears 54 and 56 may likewise be divergent from one another upon extension radially outward from the axis of revolution 98 of the clutch 10 so that the channel 92 has a width in the width direction 108 that increases radially outward from the axis of revolution 98 of the clutch 10 in the radial direction 106.

A first projection 76 extends from the body 50 and forms a terminal left side end 78 of the bearing block 18. The terminal left side end 78 is convex in shape and the first projection 76 engages the first side surface 62 of the body 50 and may have a concave shape at this point. The bearing block 18 also includes a second projection 80 that extends from the body 50 in the width direction 108 and forms a terminal right side end 82 of the bearing block 18. The terminal right side end 82 may be a convex surface and the second projection 80 may engage the second side surface 64 of the body 50 and have a concave shape at this location.

The body 50, first ear 54, second ear 56, first projection 76 and second projection 80 may be of the same size, shape, and configuration upon their entire length in the axial direction 104. The first projection 76 may be symmetrical with the second projection 80 about the axis of symmetry 74. Additionally, the first ear 54 and second ear 56 may be symmetrical about the axis of symmetry 74, and the portions of the body 50 on one side of the axis of symmetry 74 can be symmetrical with the other portions of the body 50 on the other side of the axis of symmetry 74. The previously discussed symmetry of the bearing block 18 may again allow for ease of assembly of the clutch 10.

The first projection 76 is arranged with respect to the second projection 80 so that the piloting surface 52 is formed by the first projection 76, body 50, and second projection 80. The area of the piloting surface 52 is thus increased from that in which the bearing block 18 includes only the body 50 without benefit of the projections 76 and 80. This increased piloting surface 52 in the width direction 108 has increased surface area and may consequently pilot or guide the inner race 12 in a more beneficial manner. Additionally, the increased surface area of the piloting surface 52 may allow for higher bearing loads to be applied in the clutch 10.

The first projection 76 may extend from the body 50 so as to be oriented at a ninety degree angle from the first ear 54. In a similar manner, the second projection 80 may extend from the body 50 so as to be oriented at a ninety degree angle to the direction of extension of the second ear 56 from the body 50. The second projection 80 along with the second side surface 64 may engage the spring 102. In this regard, the presence of the second projection 80 may function to space the spring 102 from the inner race 12 so that the spring 102 does not engage the inner race 12. The second side surface 64 and the second projection 80 may thus define a pocket to support the spring 102 and prevent the spring 102 from coming into contact with the inner race 12. The spring 102 may or may not contact the terminal right side end 82. Due to the symmetrical nature of the bearing block 18, the first projection 76 and the first side surface 62 may be arranged in a similar manner for a spring 102 that engages the surfaces and a repeat of this information is not necessary. Although described as being symmetrical, it is to be understood that the bearing block 18 need not be symmetrical in accordance with various exemplary embodiments.

An alternative exemplary embodiment of the bearing block 18 is illustrated with reference to FIGS. 19-23. The bearing block 18 includes a body 50, first ear 54, second ear 56, first projection 76 and second projection 80 and is arranged in a manner similar to the bearing block 18 illustrated in FIGS. 13-18 and a repeat of this information is not necessary. Additionally, the bearing block 18 includes a base 84 that is located at an end of the body 50, first ear 54, second ear 56, first projection 76 and second projection 80 in the axial direction 104. The base 84 is sized and arranged so that the outer perimeter of the body 50, first ear 54, second ear 56, first projection 76 and second projection 80 are all located within the perimeter of the base 84. The piloting surface 52 is defined by the body 50, first projection 76 and second projection 80 and is not defined by any portion of the base 84. The base 84 may be made of the same material as the body 50, first ear 54, second ear 56, first projection 76, and second projection 80 or may be made of a material that is different than these components of the bearing block 18.

The base 84 is generally rectangular in shape although its ends in the radial direction 106 are curved such that the end closest to the axis of revolution 98 of the clutch 10 in the radial direction 106 is concave in shape and so that the opposite end farthest from the axis of revolution 98 of the clutch 10 in the radial direction 106 is convex in shape. The side ends of the base 84 are angled so as to extend away from one another in the radial direction 106 away from the axis of revolution 98 of the clutch 10. A radial groove 90 is defined on an upper surface 86 of the base 84 and extends completely from the bottom end of the base 84 to the top end of the base 84. The radial groove 90 may have a semicircular cross-sectional shape and may be of the same size and shape along its entire length. The radial groove 90 is open in the axial direction 104 away from the body 50, first ear 54, second ear 56, first projection 76 and second projection 80.

Figure 24:
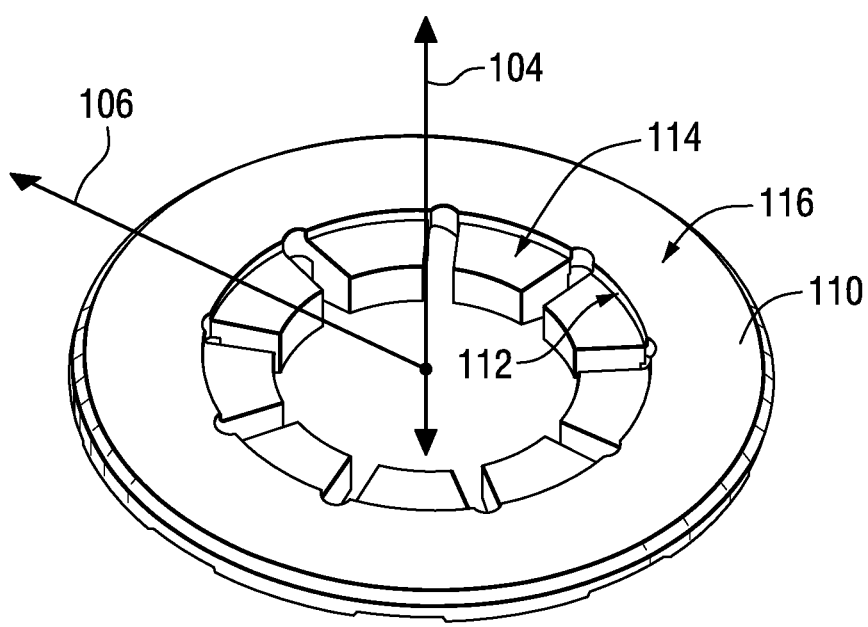
FIG. 24 is a back isometric view of a retainer.

With reference now to FIG. 24, the clutch 10 includes a retainer 110 that can be used to fix the position of various components of the clutch 10 in the axial direction 104. A perspective view of the underside of the retainer 110 is illustrated in FIG. 24. The retainer 110 has a lower surface 116 that is flat upon extending inward in the radial direction 106. An edge wall 112 is present at the inward terminal end of the flat portion of the lower surface 116 in the radial direction 106 inwards. The edge wall 112 extends in the axial direction 104 and may be flat or curvilinear in accordance with various exemplary embodiments. A series of machined pockets 114 are present and are the inward most features of the retainer 110 in the radial direction 106. The pockets 114 are separated from one another about the inner circumference of the retainer 110 and at these points of separation openings extend into the edge wall 112 outward in the radial direction 106. The pockets 114 have substantial radial clearance with the upper surface 86 of the base 84 of the bearing block 18.

Figure 25:
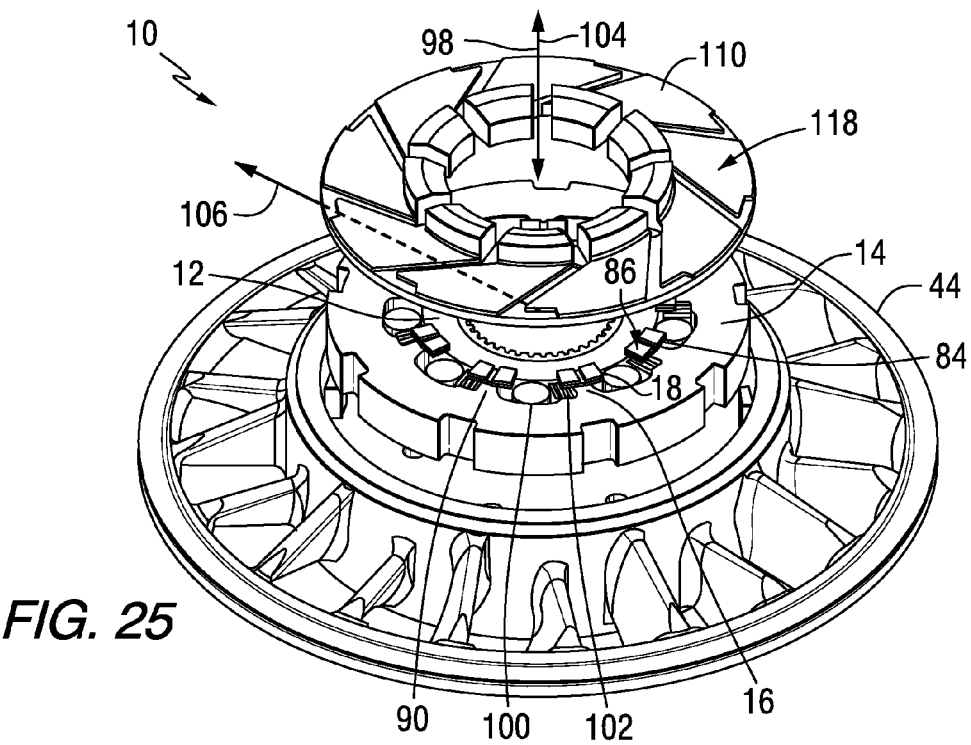
FIG. 25 is an exploded isometric assembly view of a clutch mounted in a stator in accordance with one exemplary embodiment.
Figure 26:
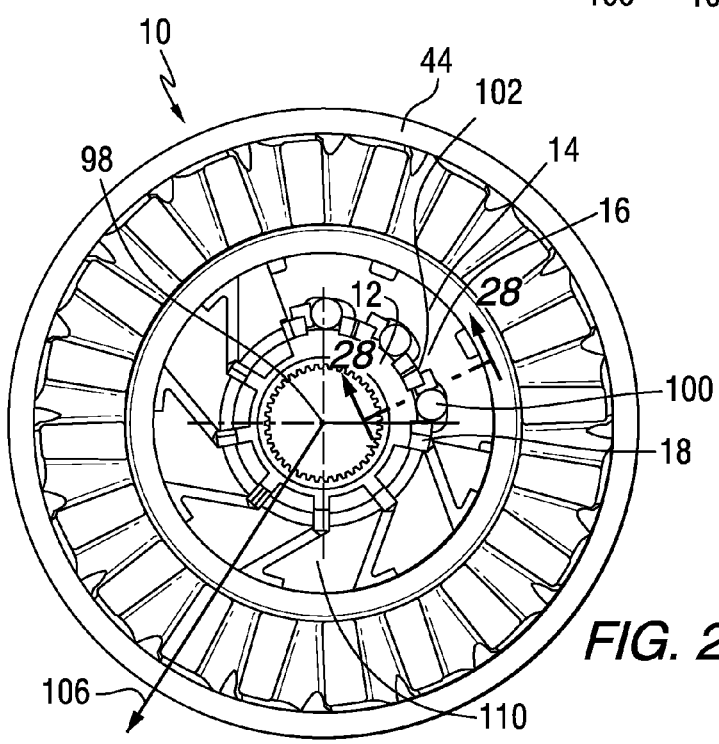
FIG. 26 is a front view of the assembled clutch shown in FIG. 25 shown in partial section.
Figure 27:
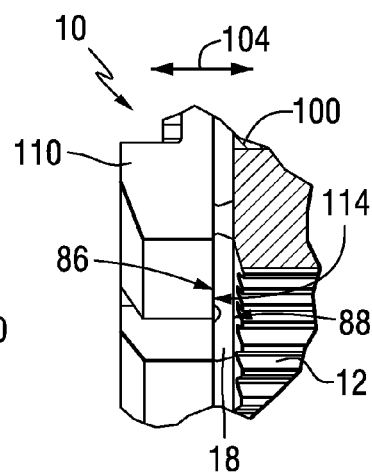
FIG. 27 is an isometric view of a portion of the clutch of FIG. 26.

FIGS. 25-27 disclose the arrangement of the clutch 10 mounted within stator 44, the clutch 10 incorporating the bearing block 18 and retainer 110 of FIGS. 19-24. The pocket 114 of the retainer 110 functions to retain the base 84 of the bearing block 18 in the axial direction 104. FIG. 27 shows engagement of the pocket 114, on the lower surface 116, to the upper surface 86 of the base 84 of the bearing block 18. The arrangement may be made so that the edge wall 112 does not contact the base 84. In this regard, the base 84 and thus the bearing block 18 may have substantial clearance in the radial direction 106 from the retainer 110. However it is to be understood that in accordance with other exemplary embodiments that the base 84 may in fact engage the edge wall 112 so that the retainer 110 functions to restrict or limit movement of the bearing block 18 in the radial direction 106. However, when not functioning to retain the bearing block 18 in the radial direction 106, the lower surface 116 and included pockets 114 and edge wall 112 may not require tight tolerances and thus may be easier to machine. The retainer 110 may be made out of aluminum or steel and the lower surface 116 may be manufactured with no additional machining.

The radial groove 90 is positioned so that it is located above the body 22 and projection 24 of the pedestal 16 in the axial direction 104. The retainer 110 is arranged with respect to the radial groove 90 so that the radial groove 90 is aligned with the openings present between the various pockets 114, and the radial groove 90 provides a path for hydraulic fluid to be pumped out of the clutch 10 by centrifugal forces during the overrun mode of the clutch 10. With reference to FIG. 25, a series of slots are formed in the upper surface 118 of the retainer 110 and extend from the openings between the pockets 114 to the outer terminal edge of the retainer 110 in the radial direction 106. With reference to FIG. 26, the radial grooves 90 are aligned with respect to these features so that hydraulic fluid flowing through the radial grooves 90 enters the slots and is transported across the upper surface 118 through the slots to the outer peripheral edge of the retainer 110 in the radial direction 106.

The radial groove 90 may be formed in the upper surface 86 of the base 84 in a variety of manners. For example, if the entire bearing block 18 including the base 84 is formed in a sintering process so that the base 84, body 50, first ear 54, second ear 56, first projection 76 and second projection 80 are all a bronze bearing block, the radial groove 90 may be formed during the compaction stage.

Figure 28:
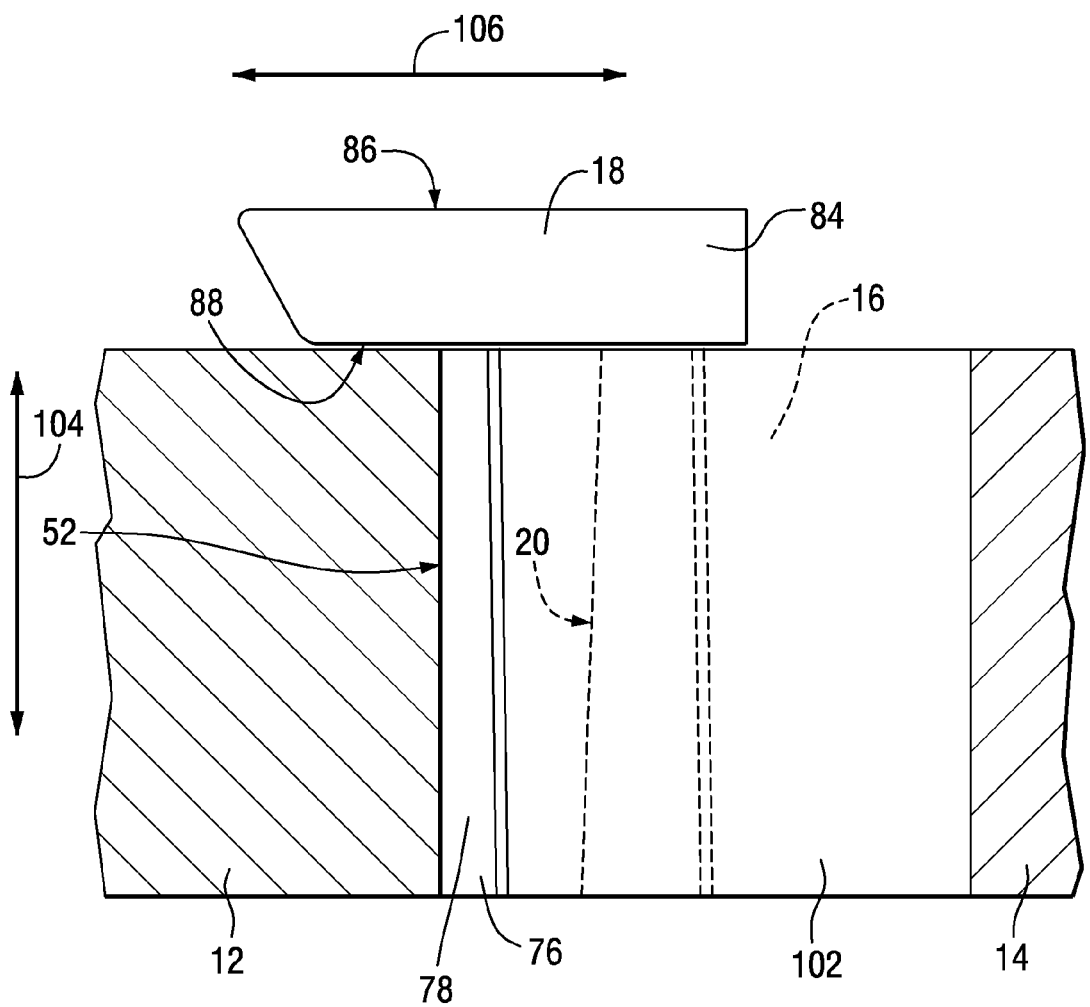
FIG. 28 is a cross-sectional view taken along line 28-28 of FIG. 26.
Figure 29:
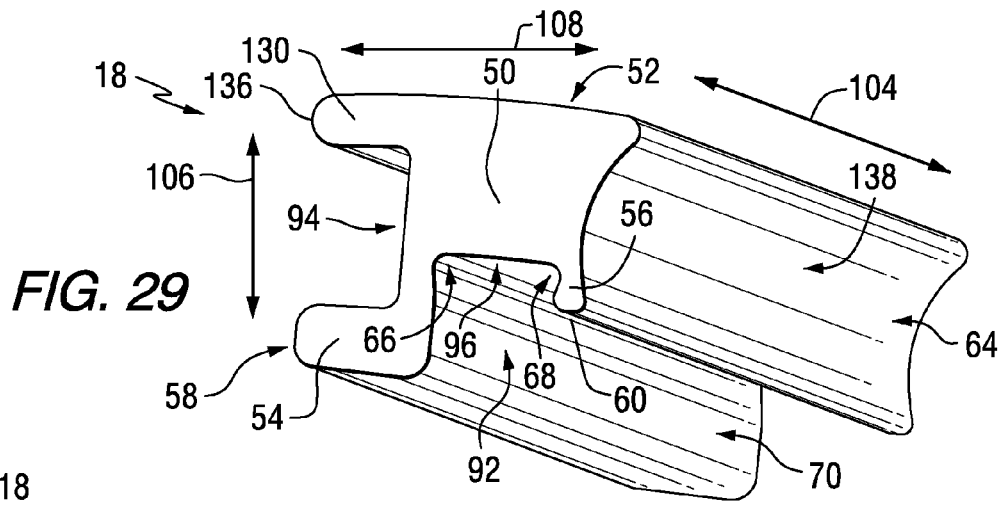
FIG. 29 is a bottom isometric view of a bearing block in accordance with another exemplary embodiment.
Figure 30:
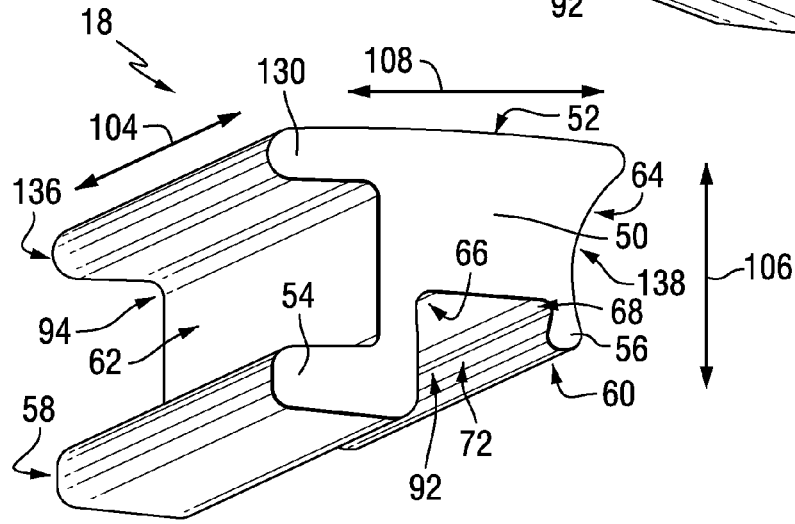
FIG. 30 is a left isometric view of the bearing block of FIG. 29.
Figure 31:
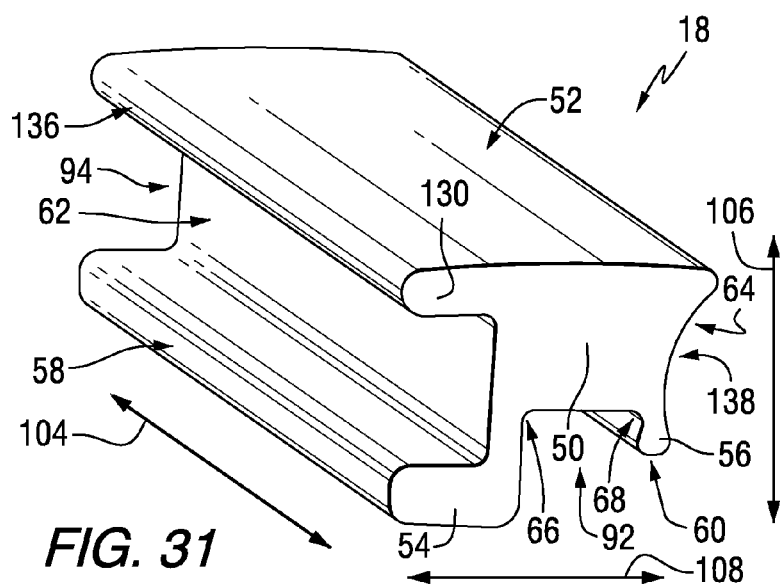
FIG. 31 is a top isometric view of the bearing block of FIG. 29.
Figure 32:
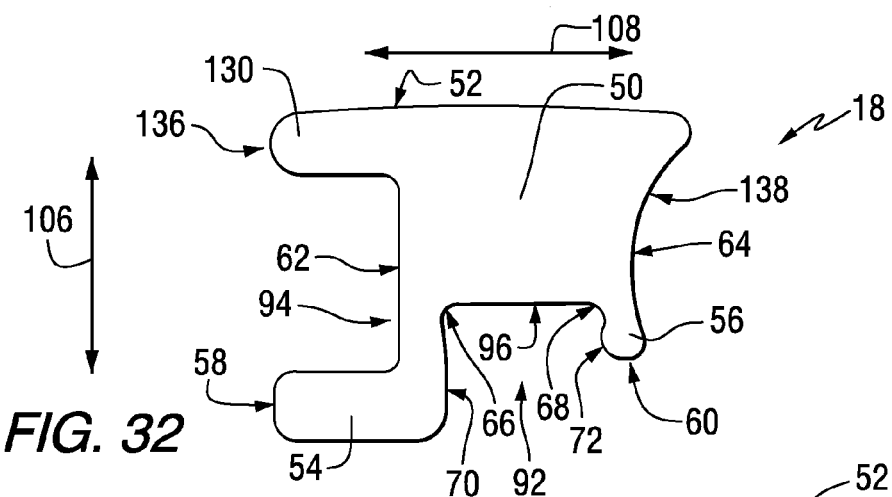
FIG. 32 is a front view of the bearing block of FIG. 29.
Figure 33:
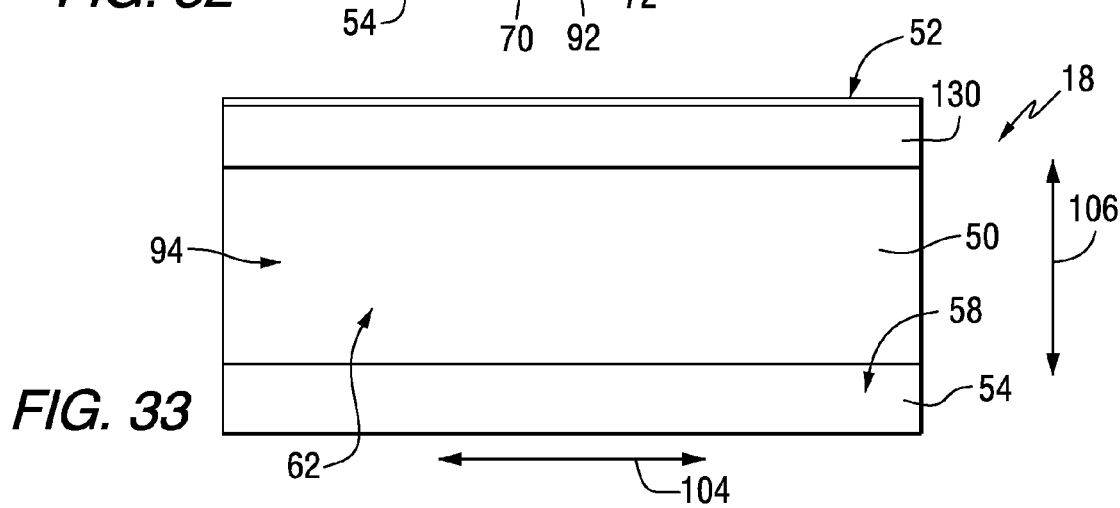
FIG. 33 is a side view of the bearing block of FIG. 29.
Figure 34:
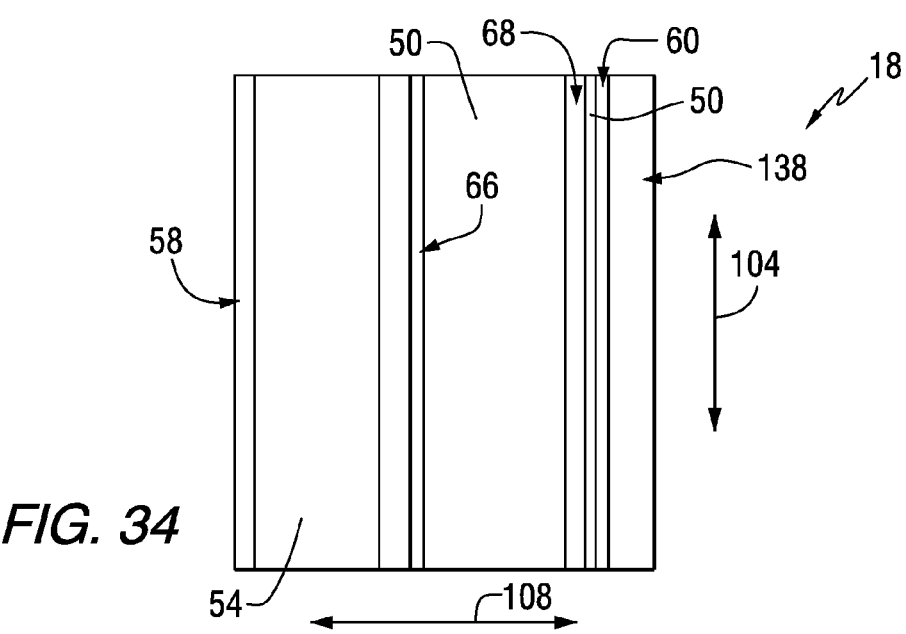
FIG. 34 is a bottom view of the bearing block of FIG. 29.

The bottom surface 88 of the base 84 engages the spring 102 and prevents the spring 102 from moving in the axial direction 104. This engagement may be more easily seen with reference with FIG. 28 that is a cross-sectional view taken along line 28-28 of FIG. 26. Engagement with the bottom surface 88 causes the spring 102 to be retained in the axial direction 104 and prevented from moving upwards in the axial direction 104 due to the fact that the retainer 110 will in turn hold the position of the base 84 stationary in the axial direction 104 upwards. The bottom surface 88 may also engage the inner race 12 and the outer race 14. In overrun mode, the engagement of the bottom surface 88 may function to act as a thrust surface for the inner race 12 and/or outer race 14. As such, the base 84 may function to both provide retention to the spring 102 and act as a thrust surface for the clutch 10. However, it is to be understood that in accordance with other exemplary embodiments that the clutch 10 may be arranged so that the base 84 if present performs only one of or neither of these two functions. The base 84 may be made of bronze, babbitt or polymeric material and may thus serve to reduce drag between the races 12 and 14, the retainer 110, or other portions of the clutch 10 that may otherwise involve steel on aluminum or steel on steel contact.

The bearing block 18 may function as a thrust surface between the inner race 12 and/or outer race 14 and the retainer 110. In this regard, the presence of the base 84 the upper surface 86 of which may engage the retainer 110, functions to separate the retainer 110 from the inner race 12 and outer race 14. The base 84 functions to reduce overall breakaway and drag torque in the clutch 10 when utilized as a torque converter.

FIGS. 29-32 illustrate an alternative exemplary embodiment of the bearing block 18. The channel 92 is formed by the body 50, first ear 54 and second ear 56. However, the first ear 54 is located closer to the axis of revolution 98 of the clutch 10 in the radial direction 106 than the second ear 56 such that the first ear 54 is longer than the second ear 56. The first ear 54 includes a planar surface 70, and the second ear 56 includes a convex shaped terminal end surface 60 and a planar surface 72. The bearing block 18 includes concave surfaces 66 and 68 and a preferentially cylindrical surface 96 of the body 50 further functions to define the channel 92. The portions of the first ear 54 and second ear 56 that define the channel 92 may be arranged so that the channel 92 becomes wider in the width direction 108 upon outward extension of the channel 92 in the radial direction 106.

The bearing block 18 includes a second channel 94 that is defined by the body 50, first ear 54, and a third ear 130. The terminal end surface 58 of the first ear 54 is convex in shape, and a terminal end surface 136 of the third ear 130 is also provided so as to be convex in shape. The body 50 includes a first side surface 62 that is planar in shape and functions to define a portion of the second channel 94. The second channel 94 is open in the width direction 108 and is bound in the radial direction 106 by the ears 54 and 130. The first ear 54 and the third ear 130 may extend in the width direction 108 the same amount from the first side surface 62 so that the second channel 94 is symmetrical in shape.

The piloting surface 52 of the bearing block 18 is formed on the outward end of the bearing block 18 in the radial direction 106 and is defined by the body 50 and the third ear 130. The end of the bearing block 18 opposite to that of the second channel 92 in the width direction 108 includes a roller engagement surface 138. The roller engagement surface 138 extends from a convex edge of the body 50 to the terminal end surface 60 of the second ear 56. The roller engagement surface 138 is concave in shape.

Figures 35, 36:
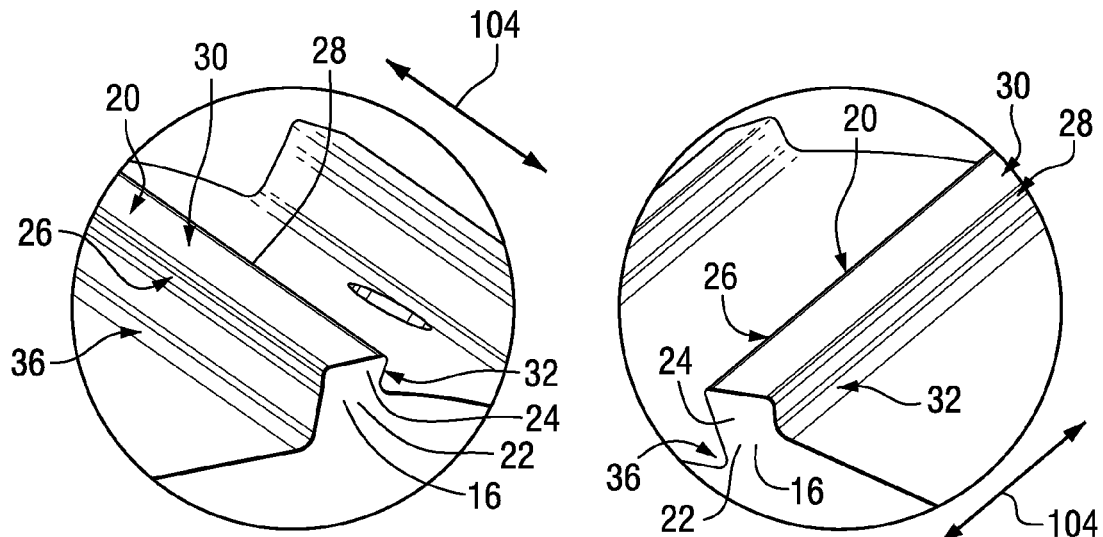
FIG. 35 is a left isometric view of an inner race in accordance with one exemplary embodiment.
FIG. 36 is a right isometric view of the inner race of FIG. 35.
Figure 37:
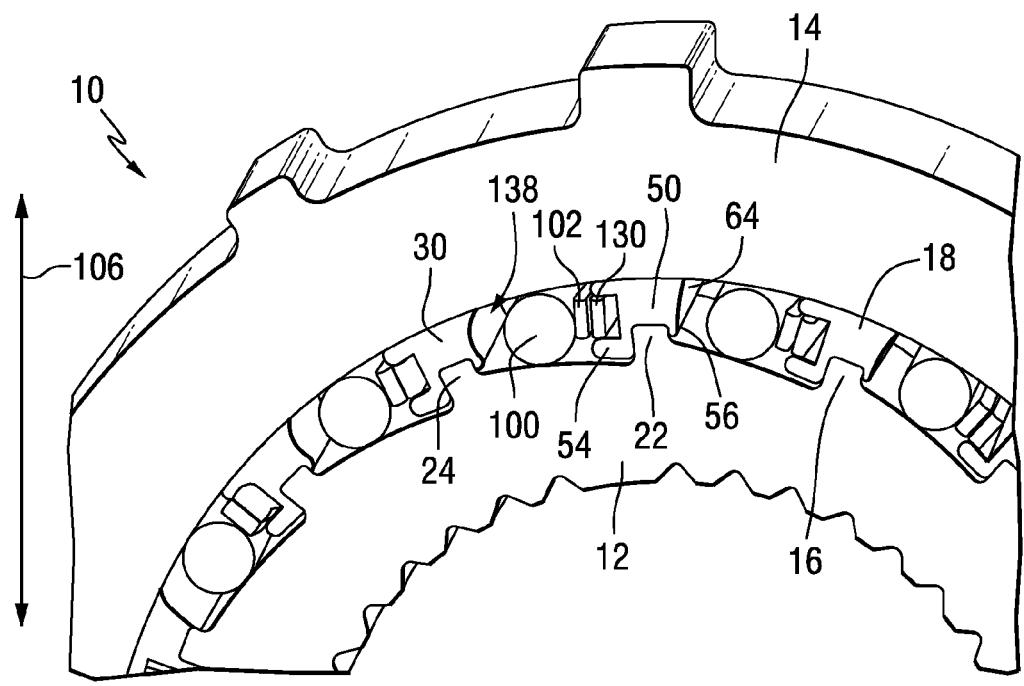
FIG. 37 is an isometric view of a portion of a clutch that incorporates the inner race of FIGS. 35 and 36 and the bearing block of FIGS. 29-34.

FIGS. 35 and 36 disclose the pedestal 16 used in connection with the exemplary embodiment of the bearing block 18 of FIGS. 29-34. FIG. 37 shows a section of the clutch 10 when assembled. The pedestal 16 extends from and is integrally formed with the inner race 12 of the clutch 10. The first receiving surface 32 of the body 22 is located at a different radial distance from the axis of revolution 98 of the clutch 10 in the radial direction 106 than the second receiving surface 36. The projection 24 extends in the radial direction 106 outward so that its size in the width direction 108 increases. Placement of the bearing block 18 onto the pedestal 16 causes the bearing block 18 to be retained in both the radial direction 106 and the width direction 108 due to the dovetail configuration between the bearing block 18 and the pedestal 16. It is to be understood, however, that in accordance with other exemplary embodiments that the pedestal 16 and bearing block 18 do not engage one another at the slot 92 with a dovetail arrangement. In certain embodiments, the bearing block 18 may be retained to the pedestal 16 by a light interference fit.

The spring 102 is located within the second channel 94 and engages the body 50, first ear 54 and third ear 130. The spring 102 may be arranged in the clutch 10 so that it does not contact either the inner race 12 or the outer race 14 and is instead free from engagement with and located between both the inner race 12 and outer race 14 in the radial direction 106. The spring 102 engages the roller 100 that is also located between the inner and outer races 12, 14 in the radial direction 106. The second channel 94 thus functions to retain the spring 102 and guide the spring 102 in a desired manner.

The piloting surface 52 engages the outer race 14 and function to guide or pilot the outer race 14 when the clutch 10 is overrunning. A roller 100 from an adjacent pocket may engage the roller engagement surface 138 of the bearing block 18. The concave shape of the roller engagement surface 138 is complimentary to the convex shape of the roller 100 so that these two surfaces fit into one another upon their engagement in a conformal fashion.

The bearing block 18 may be manufactured via a variety of methods. For example, the bearing blocks 18 may be made through the use of powder metallurgy. The bearing blocks 18 may have a low coefficient of friction and may be made of bronze or copper bearing alloys. In other arrangements, the bearing blocks 18 may be manufactured by plastic injection molding. The bearing blocks 18 may be made of a polymeric material.

The clutch 10 may be a roller one-way clutch and may be incorporated into torque converters. The clutch 10 may be a torque converter clutch in certain exemplary embodiments that may be capable of operating in a free-wheel mode. When configured as a one-way clutch, the stator may be capable of being placed into a free-wheel or overrun condition in which torque is not transferred across the one-way clutch. Although described as not employing a cage, it is to be understood that the clutch 10 may in fact have a cage in certain exemplary embodiments while in other embodiments, such as those illustrated, the clutch 10 lacks a cage between the inner race 12 and the outer race 14.

The bearing block 18 may be made out of a single material or a combination of materials. The bearing block 18 may be made from plastic, bronze, polymeric material, and/or copper bearing alloys.

Experiment Carried Out in Accordance with Certain Exemplary Embodiments

Experiments were conducted to determine the effectiveness of the bearing blocks 18 as incorporated into a clutch 10.

Table 1 below discloses the results of the wear on the race and piloting surface 52 through the use of different piloting options such as a bare pedestal 16 that is coated with phosphate (an example of which is shown in FIG. 2), a bearing block 18 made of a nylon based material and a bearing block 18 that is made of sintered bronze. The results of the experiment are as follows:

TABLE 1

| PILOTING OPTION | WEAR (mm) | | | COMMENTS |
|---|---|---|---|---|
| | RACE | PILOTING SURFACE | TOTAL | |
| REFERENCE BARE PEDESTAL 16 (PHOSPHATE COATED) | 0.078 | 0.381 | 0.459 | AVERAGE OF 3 TESTS (0.262) |
| | 0.025 | 0.255 | 0.187 | |
| | 0.032 | 0.108 | 0.140 | |
| BEARING BLOCK 18 (NYLON BASED) | 0.007 | 0.155 | 0.162 | AVERAGE OF 2 TESTS (0.117) |
| | 0.029 | 0.043 | 0.072 | |
| BEARING BLOCK 18 (SINTERED BRONZE) | 0.002 | 0.082 | 0.084 | AVERAGE OF 3 TESTS (0.110) |
| | 0.012 | 0.049 | 0.061 | |
| | 0.036 | 0.149 | 0.185 | |

As discovered, the use of a clutch 10 that incorporates bearing blocks 18 made of nylon or sintered bronze exhibits reduced wear as opposed to clutches 10 that incorporate a phosphate coated pedestal 16.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A clutch, comprising:
   an inner race;
   an outer race displaceable relative to said inner race;
   a first pedestal, extending from at least one of said inner and outer race;
   a first bearing block engaging said first pedestal, said first bearing block and said first pedestal extending between the inner and outer races;
   a first spring engaging said first bearing block and said first pedestal at the same time;
   a roller engaging said first spring, wherein said first spring directly faces said bearing block and said roller and is located in an arc length direction between said first bearing block and said roller;
   a second pedestal, extending from at least one of said inner and outer race;
   a second bearing block engaging said second pedestal, wherein said roller directly faces said first spring and said second bearing block and is located in an arc length direction between said first spring and said second bearing block; and
   a second spring engaging said second bearing block.

2. The clutch as set forth in claim 1, wherein said first pedestal is integrally formed with at least one of said inner and outer race.

3. The clutch as set forth in claim 1, wherein said first bearing block is mounted at an end of said first pedestal.

4. The clutch as set forth in claim 1, wherein said first bearing block comprises a material different than said first pedestal, selected from the group consisting of polymeric material, babbitt and bronze.

5. The clutch as set forth in claim 1, wherein said inner and outer races are circular and a plurality of additional bearing blocks and additional pedestals are utilized to maintain concentricity of said inner and outer races.

6. The clutch as set forth in claim 1, wherein said first bearing block further comprises:
   a body;
   a first ear that extends outwardly from said body in one direction; and
   a second ear that extends outwardly from said body in the same direction, wherein the body, the first ear and the second ear define a channel.

7. The clutch as set forth in claim 1, wherein said first pedestal extends from one of said inner and outer races and said first bearing block engages the other of said inner and outer races.

8. The clutch as set forth in claim 7, wherein said first bearing block and said first pedestal are utilized to maintain a preselected distance between said inner race and said outer race.

9. A clutch, comprising:
   an inner race;
   an outer race displaceable relative to said inner race;
   a pedestal, extending from at least one of said inner and outer race; and
   a bearing block engaging said pedestal, said bearing block and said pedestal extending between the inner and outer races;
   wherein said pedestal has:
   a pedestal body formed integrally with at least one of said inner and outer races;
   a projection, extending from said pedestal body in a direction opposite said race, having a plurality of convex surfaces sized and shaped to conformally engage said bearing block.

10. The clutch as set forth in claim 9, wherein said channel is sized and shaped to conform to a similarly sized and shaped end of said pedestal.

11. A clutch, comprising:
   an inner race;
   an outer race displaceable relative to said inner race;
   a pedestal, extending from at least one of said inner and outer race; and
   a bearing block engaging said pedestal, said bearing block and said pedestal extending between the inner and outer races;
   wherein said bearing block further comprises a piloting surface at one end which engages at least one of said inner and outer races; and wherein said bearing block has a body and at least one projection extending outwardly from said body, said projection enlarging said piloting surface beyond the perimeter of said body of said bearing block.

12. The clutch as set forth in claim 11, wherein said piloting surface and said at least one projection form an engagement surface with at least one of said inner and outer races, said engagement surface having a curvature matching at least one of said inner and outer races.

13. A clutch, comprising:
   an inner race;
   an outer race displaceable relative to said inner race;
   a pedestal, extending from at least one of said inner and outer race; and
   a bearing block engaging said pedestal, said bearing block and said pedestal extending between the inner and outer races;

wherein said bearing block further comprises:
a main body conformally engaged with said pedestal, said main body extending substantially across at least one of said inner and outer races in a first direction; and
a base, mounted on said main body, perpendicular to said first direction.

14. The clutch as set forth in claim 13, wherein said main body further comprises a channel in said first direction and said base is mounted at one end of said channel, said base engaging a portion of said pedestal.

15. The clutch as set forth in claim 13, further comprising a groove in said base.

16. A stator, comprising:
a stator body; and
a clutch centrally disposed at the center of said stator body such that said stator body rotates in conjunction with at least a portion of said clutch, said clutch further comprising:
an inner race;
an outer race displaceable relative to said inner race;
a pedestal, extending from at least one of said inner and outer race; and
a bearing block engaging said pedestal, said bearing block and said pedestal extending between the inner and outer races, wherein the bearing block has a body and a projection that extends from the body, wherein the projection contacts at least one of said inner and outer race but is free from contact with the pedestal.

17. The stator as set forth in claim 16, wherein said pedestal is integrally formed with at least one of said inner and outer race.

18. The stator as set forth in claim 16, wherein said bearing block is mounted at an end of said pedestal.

19. The stator as set forth in claim 16, wherein said bearing block comprises a material different than said pedestal, selected from the group consisting of polymeric material, babbitt and bronze.

20. The stator as set forth in claim 16, wherein said bearing block further comprises:
said bearing block body;
a first ear that extends outwardly from said bearing block body in one direction; and
a second ear that extends outwardly from said bearing block body in the same direction, wherein the bearing block body, the first ear and the second ear define a channel.

21. A stator, comprising:
a stator body; and
a clutch centrally disposed at the center of said stator body such that said stator body rotates in conjunction with at least a portion of said clutch, said clutch further comprising:
an inner race;
an outer race displaceable relative to said inner race;
a pedestal, extending from at least one of said inner and outer race; and
a bearing block engaging said pedestal, said bearing block and said pedestal extending between the inner and outer races;
wherein said pedestal has:
a pedestal body formed integrally with at least one of said inner and outer races;
a projection, extending from said pedestal body in a direction opposite said race, having a plurality of convex surfaces sized and shaped to conformally engage said bearing block.

22. The stator as set forth in claim 21, wherein said channel is sized and shaped to conform to a similarly sized and shaped end of said pedestal.

23. A stator, comprising:
a stator body; and
a clutch centrally disposed at the center of said stator body such that said stator body rotates in conjunction with at least a portion of said clutch, said clutch further comprising:
an inner race;
an outer race displaceable relative to said inner race;
a pedestal, extending from at least one of said inner and outer race; and
a bearing block engaging said pedestal, said bearing block and said pedestal extending between the inner and outer races;
wherein said bearing block further comprises a piloting surface at one end which engages at least one of said inner and outer races; and at least one projection extending outwardly from said body, said projection enlarging said piloting surface beyond the perimeter of said body of said bearing block.

24. The stator as set forth in claim 23, wherein said piloting surface and said at least one projection form an engagement surface with at least one of said inner and outer races, said engagement surface having a curvature matching said at least one of said inner and outer races.

25. A stator, comprising:
a stator body; and
a clutch centrally disposed at the center of said stator body such that said stator body rotates in conjunction with at least a portion of said clutch, said clutch further comprising:
an inner race;
an outer race displaceable relative to said inner race;
a pedestal, extending from at least one of said inner and outer race; and
a bearing block engaging said pedestal, said bearing block and said pedestal extending between the inner and outer races;
wherein said bearing block further comprises:
a main body conformally engaged with said pedestal, said main body extending substantially across said at least one of said inner and outer races in a first direction; and
a base, mounted on said main body, perpendicular to said first direction.

26. The stator as set forth in claim 25, wherein said clutch is mounted within said stator with at least one restraining device, said base being interposed between said clutch and said restraining device.

27. The stator as set forth in claim 25, wherein said main body further comprises a channel in said first direction and said base is mounted at one end of said channel, said base engaging a portion of said pedestal.

28. The stator as set forth in claim 25, further comprising a groove in said base.

* * * * *